(12) United States Patent
Negoro et al.

(10) Patent No.: US 8,018,372 B2
(45) Date of Patent: Sep. 13, 2011

(54) SPREAD SPECTRUM RADAR APPARATUS, METHOD FOR DETERMINING VIRTUAL IMAGE, AND METHOD FOR SUPPRESSING VIRTUAL IMAGE

(75) Inventors: Noboru Negoro, Osaka (JP); Takeshi Fukuda, Osaka (JP); Hiroyuki Sakai, Kyoto (JP)

(73) Assignee: PANASONIC Corporation, Osaka (JP)

( * ) Notice: Subject to any disclaimer, the term of this patent is extended or adjusted under 35 U.S.C. 154(b) by 0 days.

(21) Appl. No.: 12/678,586

(22) PCT Filed: Jul. 28, 2008

(86) PCT No.: PCT/JP2008/002002
§ 371 (c)(1), (2), (4) Date: Mar. 17, 2010

(87) PCT Pub. No.: WO2009/037802
PCT Pub. Date: Mar. 26, 2009

(65) Prior Publication Data
US 2010/0194627 A1    Aug. 5, 2010

(30) Foreign Application Priority Data

Sep. 20, 2007   (JP) ................................. 2007-244014

(51) Int. Cl.
*G01S 13/58* (2006.01)
(52) U.S. Cl. ......................... 342/107; 342/130; 342/159
(58) Field of Classification Search .................. 342/107, 342/130, 159
See application file for complete search history.

(56) References Cited

U.S. PATENT DOCUMENTS

| | | | | |
|---|---|---|---|---|
| 5,724,041 | A * | 3/1998 | Inoue et al. | 342/70 |
| 5,959,571 | A * | 9/1999 | Aoyagi et al. | 342/70 |
| 6,822,605 | B2 * | 11/2004 | Brosche | 342/130 |
| 7,148,841 | B2 * | 12/2006 | Yoneda et al. | 342/132 |
| 7,289,576 | B2 | 10/2007 | Sanada | |
| 7,564,400 | B2 | 7/2009 | Fukuda | |
| 7,642,952 | B2 | 1/2010 | Fukuda | |
| 7,839,321 | B2 * | 11/2010 | Huang et al. | 342/29 |
| 2005/0195884 | A1 * | 9/2005 | Nakano et al. | 375/130 |
| 2005/0275583 | A1 | 12/2005 | Mikami et al. | |
| 2007/0109175 | A1 * | 5/2007 | Fukuda | 342/70 |
| 2007/0285307 | A1 * | 12/2007 | Nishijima et al. | 342/200 |
| 2009/0003412 | A1 | 1/2009 | Negoro et al. | |

FOREIGN PATENT DOCUMENTS

JP          05-093776          4/1993
(Continued)

*Primary Examiner* — Thomas H Tarcza
*Assistant Examiner* — Timothy A Brainard
(74) *Attorney, Agent, or Firm* — Greenblum & Bernstein, P.L.C.

(57) ABSTRACT

The spread spectrum radar apparatus in the present invention (i) includes: a transmission code generator (110); a reception code generator (121) generating a reception code obtained by delaying a transmission code; a spread modulator (112) spread-modulating a signal generated by a local oscillator (111) using the transmission code; a transmission antenna (113) transmitting the spread-modulated signal; a reception antenna (120) receiving a signal; a spread demodulator (122) demodulating the signal using the reception code to provide a correlation signal; a mixer (123) mixing the correlation signal and the signal generated by the local oscillator (111) to generate a radar signal; a virtual image determining unit (130) determining a virtual image; and a radar signal calculation device (160) calculating the radar signal using a virtual image determination signal, and (ii) adds a calculation and an offset signal for suppressing a peak intensity of the virtual image when the virtual image occurs.

16 Claims, 17 Drawing Sheets

FOREIGN PATENT DOCUMENTS

| JP | 05-297124 | 11/1993 |
| JP | 07-198826 | 8/1995 |
| JP | 11-166971 | 6/1999 |
| JP | 2001-356167 | 12/2001 |
| JP | 2003-139847 | 5/2003 |
| JP | 2005-207932 | 8/2005 |
| JP | 2008-145424 | 6/2008 |

* cited by examiner

SPREAD SPECTRUM RADAR APPARATUS, METHOD FOR DETERMINING VIRTUAL IMAGE, AND METHOD FOR SUPPRESSING VIRTUAL IMAGE

TECHNICAL FIELD

The present invention relates to a spread spectrum radar apparatus using a spread spectrum method, and particularly to a spread spectrum radar apparatus which suppresses at least one alias signal that may cause false detection of the presence of an object and that is different from a reception signal.

BACKGROUND ART

In recent years, various techniques of spread spectrum radar apparatuses using spread spectrum methods have been suggested (for example, see Patent Reference 1).

The spread spectrum radar apparatuses spread-modulate narrow band signals to wide band signals using transmission pseudo-noise codes. The spread spectrum radar apparatuses transmit the spread-modulated wide band signals as radar waves. Then, the spread spectrum radar apparatuses receive, as reception signals, reflected waves obtained by reflecting the transmitted radar waves from objects. Then, the spread spectrum radar apparatuses spread demodulate the reception signals to correlation signals using reception pseudo-noise codes. Based on the correlation signals obtained through the spread demodulation, the spread spectrum radar apparatuses calculate the presence or absence of objects, distances to the objects, and relative velocities of the objects.

Here, the transmission pseudo-noise code is a pseudo-noise code, such as an M-sequence code and a Gold sequence code. Here, the M-sequence code is used as an example due to its superior autocorrelation characteristic. Furthermore, the reception pseudo-noise code is a pseudo-noise code obtained by delaying the transmission pseudo-noise code. In other words, the reception pseudo-noise code is a pseudo-noise code obtained by shifting a phase of the transmission pseudo-noise code by a chip count corresponding to the delay time. The delay time corresponds to a difference between a transmission time period of the radar waves and the reception time period of the reflected waves.

Next, the detection principle behind the spread spectrum radar apparatuses will be described with reference to drawings.

FIG. 1 illustrates an outline of the detection principle behind a conventional spread spectrum radar apparatus. Here, a scan range is from 1 to 100 meters inclusive, and the resolution is 1 meter as an example.

In order to cover the scan range under the assumption, the spread spectrum radar apparatus generates a reception pseudo-noise code to correspond to a transmission pseudo-noise code 11 by displacing 1 to 100 chips of the reception pseudo-noise code in ascending order. Here, since a width of one chip in a code determines a resolution, a phase shift by 100 chips becomes necessary, and a cycle of pseudo-noise codes needs not smaller than 100 bits.

When codes are displaced by 100 chips as in a reception pseudo-noise code 16, the process returns to the initial state, and the spread spectrum radar apparatus repeatedly generates reception pseudo-noise codes by displacing codes of 1 to 100 chips in ascending order again. Here, a time period from displacement of 1 to 100 chips corresponding to the scan range to restoration to the initial state is defined as one radar scan cycle.

More specifically, the spread spectrum radar apparatus generates a reception pseudo-noise code by displacing the transmission pseudo-noise code 11 by one chip or a unit not larger than one chip. Then, the spread spectrum radar apparatus performs a correlation between the generated reception pseudo-noise code and a reception signal 13. Then, when a phase of the generated reception pseudo-noise code matches a phase of the reception signal 13, a correlation signal peaks. On the other hand, when the phases do not match each other, a correlation signal does not peak. A synchronous state in which the phases match each other and a non-synchronous state in which the phases do not match each other will be hereinafter described.

For example, when the spread spectrum radar apparatus performs a correlation between a reception pseudo-noise code 14 and the reception signal 13, the correlation signal does not peak as being in the non-synchronous state. On the other hand, since a reception pseudo-noise code 15 and the reception signal 13 are in the synchronous state, the correlation signal peaks. Here, the reception pseudo-noise code 14 is a reception pseudo-noise code obtained by shifting a phase of the transmission pseudo-noise code 11 by one chip. The reception pseudo-noise code 15 is a reception pseudo-noise code obtained by shifting the phase of the transmission pseudo-noise code 11 by a predetermined count of chips.

FIG. 2 illustrates an outline of a radar signal that has been spread-demodulated by a conventional spread spectrum radar apparatus.

As illustrated in (a) in FIG. 2, when phases match each other (i.e. a synchronous state), a radar signal peaks. When phases do not match each other (i.e. non-synchronous state), a radar signal does not peak. Furthermore, when a single object is present, only a peak appears per cycle of codes. When plural objects are present, plural peaks appear. Thereby, the spread spectrum radar apparatus can detect each object by detecting a peak from the received reflected waves. Here, the peak intensity appearing in the radar signal is determined by a degree and a distance in and at which a radar signal is reflected from a target object.

As such, the spread spectrum radar apparatus specifies a count of chips corresponding to a phase shift between a transmission signal 12 and a reception signal 13 using the transmission pseudo-noise code 11 and the reception pseudo-noise code 15 so that a delay time corresponding to the specified count of chips corresponding to the phase shift can be specified. Furthermore, a distance to an object can be calculated through calculation of a distance corresponding to the specified delay time. Here, the transmission signal 12 is radar waves transmitted from the spread spectrum radar apparatus. The reception signal 13 is reflected waves obtained by reflecting the radar waves from the object.

However, there are cases where a peak may appear which may cause false detection of detecting other than the reflected waves obtained by reflecting the radar waves from a target object, depending on a pseudo-noise code and others to be used.

In order to solve the problem, the spread spectrum radar apparatus including a processing unit that reduces false detection of a radar signal as a target detecting unit 9 as illustrated in FIG. 3 has been disclosed (for example, see Patent Reference 2). The spread spectrum radar apparatus can reduce the false detection by setting a threshold for detecting a target object using an average value and a standard deviation of the radar signals.

Patent Reference 1: Japanese Unexamined Patent Application Publication No. 5-93776

Patent Reference 2: Japanese Unexamined Patent Application Publication No. 2005-207932

DISCLOSURE OF INVENTION

Problems that Invention is to Solve

However, there are cases where a peak appears in a position where in principle the peak does not appear, due to e.g., a nonlinear characteristic of a constituent device in the spread spectrum radar apparatus, reflection by propagation of signals from one line to another, and reflection and a distortion of a signal that are caused by a mismatch. The example is illustrated in (b) in FIG. 2. (b) in FIG. 2 shows a case where at least one alias signal occurs in a correlation signal. Here, the alias signal corresponds to virtual images and is different from a reception signal occurring from a target object.

Thus, the conventional spread spectrum radar apparatus has a problem that a phenomenon occurs in which the alias signal causes as if an object was present even when an object is not actually present.

Furthermore, the phenomenon occurs in a different position when a sequence of a pseudo-noise code is changed. As a result, there is a problem that a probability of falsely detecting the presence of a target object increases.

Thus, the present invention has been conceived in view of the aforementioned problems, and the object thereof is to provide a spread spectrum radar apparatus that can reduce the probability of falsely detecting the presence of an object.

Means to Solve the Problems

In order to achieve the object, the spread spectrum radar apparatus according to an aspect of the present invention is a spread spectrum radar apparatus that detects an object using detection radio waves that are spectrum-spread, and includes: a local oscillator that generates a narrow band signal; a transmission code generator that generates a first pseudo-noise code; a reception code generator that generates a second pseudo-noise code obtained by delaying the first pseudo-noise code; a spread modulator that spread-modulates the narrow band signal generated by the local oscillator, using the first pseudo-noise code; a transmission unit configured to transmit the signal spread-modulated by the spread modulator; a reception unit configured to receive reflected waves of the signal transmitted by the transmission unit; a spread demodulator that spread-demodulates the signal received by the reception unit, using the second pseudo-noise code; a mixer that generates a radar signal by frequency conversion using the signal spread-demodulated by the spread demodulator and the narrow band signal generated by the local oscillator; and a virtual image determining unit configured to determine a virtual image from the radar signal having a frequency obtained by the mixer.

With the configuration, the virtual image determining unit of the spread spectrum radar apparatus in the present invention can detect occurrence of a virtual image and reduce false detection of the presence of an object.

Furthermore, the virtual image determining unit in the spread spectrum radar apparatus according to an aspect of the present invention includes: a code-change control unit configured to repeatedly change a type of the first pseudo-noise code generated by the transmission code generator and a type of the second pseudo-noise code generated by the reception code generator; and a virtual-image determining calculation unit configured to determine the virtual image by comparing radar signals that include the radar signal and that are obtained before and after changing the type of the first pseudo-noise code and the type of the second pseudo-noise code.

Furthermore, the code-change control unit in the spread spectrum radar apparatus according to an aspect of the present invention is configured to repeatedly change the type of the first pseudo-noise code and the type of the second pseudo-noise code until the virtual-image determining calculation unit determines that the virtual image is absent within a scan range.

With these configurations, the code-change control unit changes a type of a code at predetermined intervals so that the virtual-image determining calculation unit can determine whether or not a virtual image occurs in real time during a radar operation. In other words, the influence of a virtual image can be avoided by changing the type of a pseudo-noise code until no virtual image is recognized within a scan range of a radar.

Furthermore, the virtual image determining unit in the spread spectrum radar apparatus according to an aspect of the present invention further includes: a signal attenuator that is displaced between the transmission unit and the reception unit; a first switch that switches a connection between the spread modulator and the transmission unit, or between the spread modulator and the signal attenuator; a second switch that switches a connection between the spread demodulator and the reception unit, or between the spread demodulator and the signal attenuator; a switching control unit configured to control switching between the first switch and the second switch; and a virtual-image determining calculation unit configured to perform a calculation for determining the virtual image, wherein the switching control unit is configured, before the transmission unit transmits the signal spread-modulated by the spread modulator, to control the first switch to switch the connection between the spread modulator and the signal attenuator, and to control the second switch to switch the connection between the spread demodulator and the signal attenuator, and the virtual image determining unit is configured to determine a radar signal as the virtual image, the radar signal being different from the radar signal that is delayed and is detected before the transmission unit transmits the signal.

With the configuration, the switching control unit performs a switching operation before transmitting a signal from the transmission unit, and the virtual image determining unit determines a virtual image when detecting a radar signal that is different from a radar signal that is delayed, such that it becomes possible to determine whether or not a virtual image occurs.

Furthermore, the virtual image determining unit in the spread spectrum radar apparatus according to an aspect of the present invention is configured to determine a detected radar signal as the virtual image, when the detected radar signal exceeds a predetermined threshold.

Furthermore, the switching control unit in the spread spectrum radar apparatus according to an aspect of the present invention is further configured, after the virtual image determining unit determines the virtual image, to control the first switch to switch the connection between the spread modulator and the transmission unit, and to control the second switch to switch the connection between the spread demodulator and the reception unit, and the virtual image determining unit further includes a code-change control unit configured to repeatedly change the type of the first pseudo-noise code generated by the transmission code generator and the type of the second pseudo-noise code generated by the reception code generator until the virtual-image determining calculation unit determines that the virtual image is absent within a scan range.

With the configuration, a virtual image can be determined before the radar operation. Furthermore, when a virtual image occurs within a scan range of a radar, the virtual image can be avoided by changing the code to another code of a different type.

Furthermore, the spread spectrum radar apparatus according to an aspect of the present invention further includes a radar signal calculation unit configured to calculate the radar signal provided by the mixer, using a virtual image determination signal provided by the virtual image determining unit.

Furthermore, the radar signal calculation unit in the spread spectrum radar apparatus according to an aspect of the present invention is configured to calculate the radar signal provided by the mixer, using the virtual image determination signal provided by the virtual image determining unit.

Furthermore, the radar signal calculation unit in the spread spectrum radar apparatus according to an aspect of the present invention is configured to perform a correction calculation by multiplying radar signals including the radar signal by a correction coefficient, using the virtual image determination signal provided by the virtual image determining unit, and calculating an average value or an integrated value of the radar signals, the correction coefficient suppressing the virtual image.

Furthermore, the radar signal calculation unit in the spread spectrum radar apparatus according to an aspect of the present invention is configured to perform a correction calculation by determining a correction coefficient according to a peak intensity of the virtual image, the correction coefficient suppressing the virtual image.

With these configurations, when a virtual image occurs from a radar signal, the radar signal calculation unit performs a correction calculation on the radar signal so that it can effectively reduce the influence of the virtual image.

Furthermore, the radar signal calculation unit is configured to generate a signal in which positive and negative of the radar signal provided by the spread demodulator are reversed, using the virtual image determination signal provided by the virtual image determining unit, and to perform a correction calculation by adding the radar signal in which positive and negative of the radar signal provided by the spread demodulator are reversed to the radar signal provided by the spread demodulator.

With the configuration, the radar signal calculation unit can offset a virtual image signal by adding an inverting signal when the virtual image occurs from a radar signal, so that the influence of the virtual image can be avoided.

The present invention can be implemented not only as such a spread spectrum radar apparatus, but also as a method for determining a virtual image and a method for suppressing a virtual image, using characteristic units included in the spread spectrum radar apparatus as steps, and as a program causing a computer to execute such characteristic steps. It is obvious that such program can be distributed by recording media, such as a CD-ROM, and via transmission media, such as the Internet.

EFFECTS OF THE INVENTION

The spread spectrum radar apparatus according to the present invention can determine a virtual image signal to be observed, perform a correction calculation on the virtual image signal, reduce or avoid the influence of the virtual image signal, and avoid a false operation of the radar apparatus.

Thereby, there is an effect of reducing a probability of falsely detecting the presence of an object, and of providing a spread spectrum radar apparatus superior in its safety.

Figure 1:
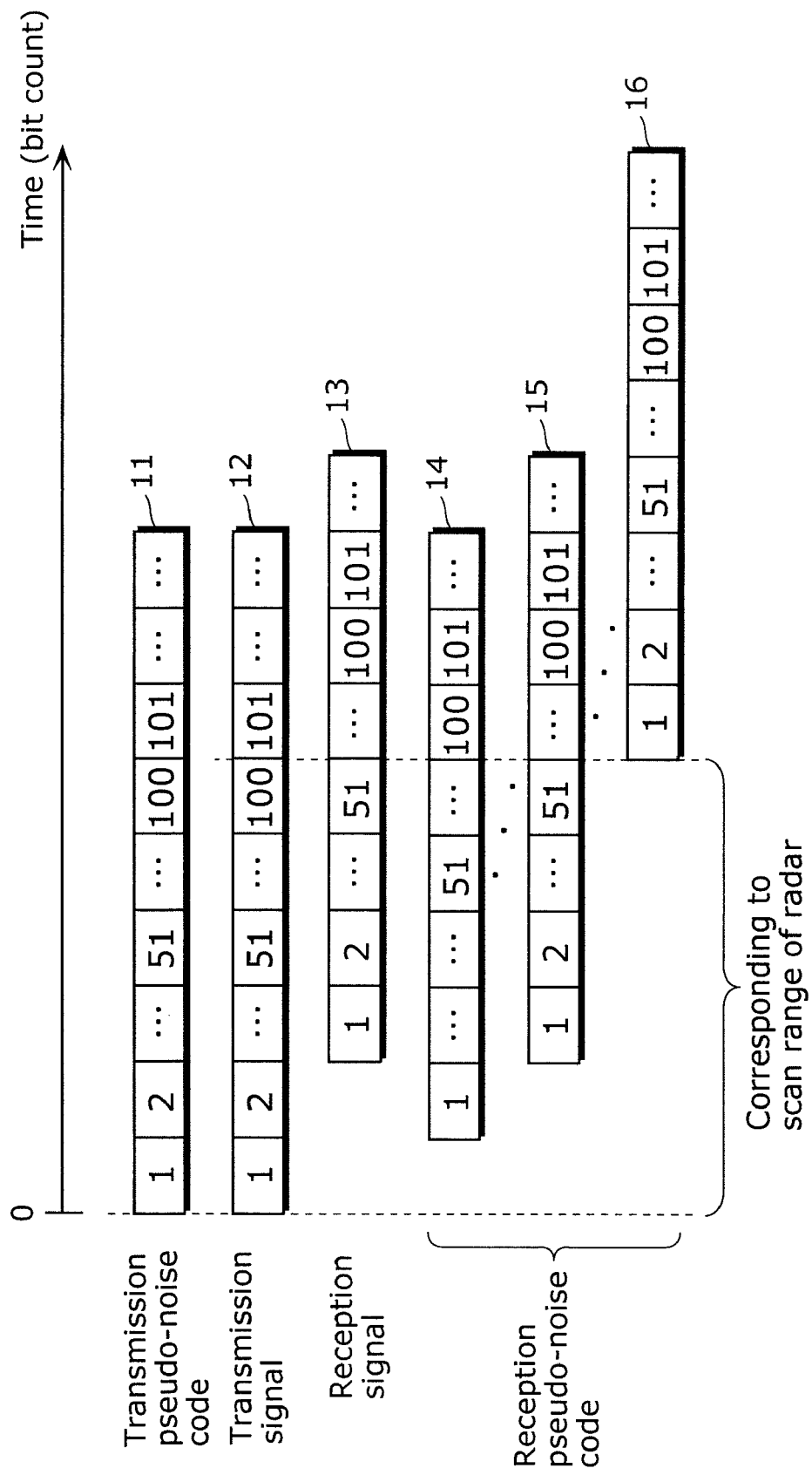
FIG. 1 illustrates an outline of a detection principle behind a spread spectrum radar apparatus.
Figure 2:
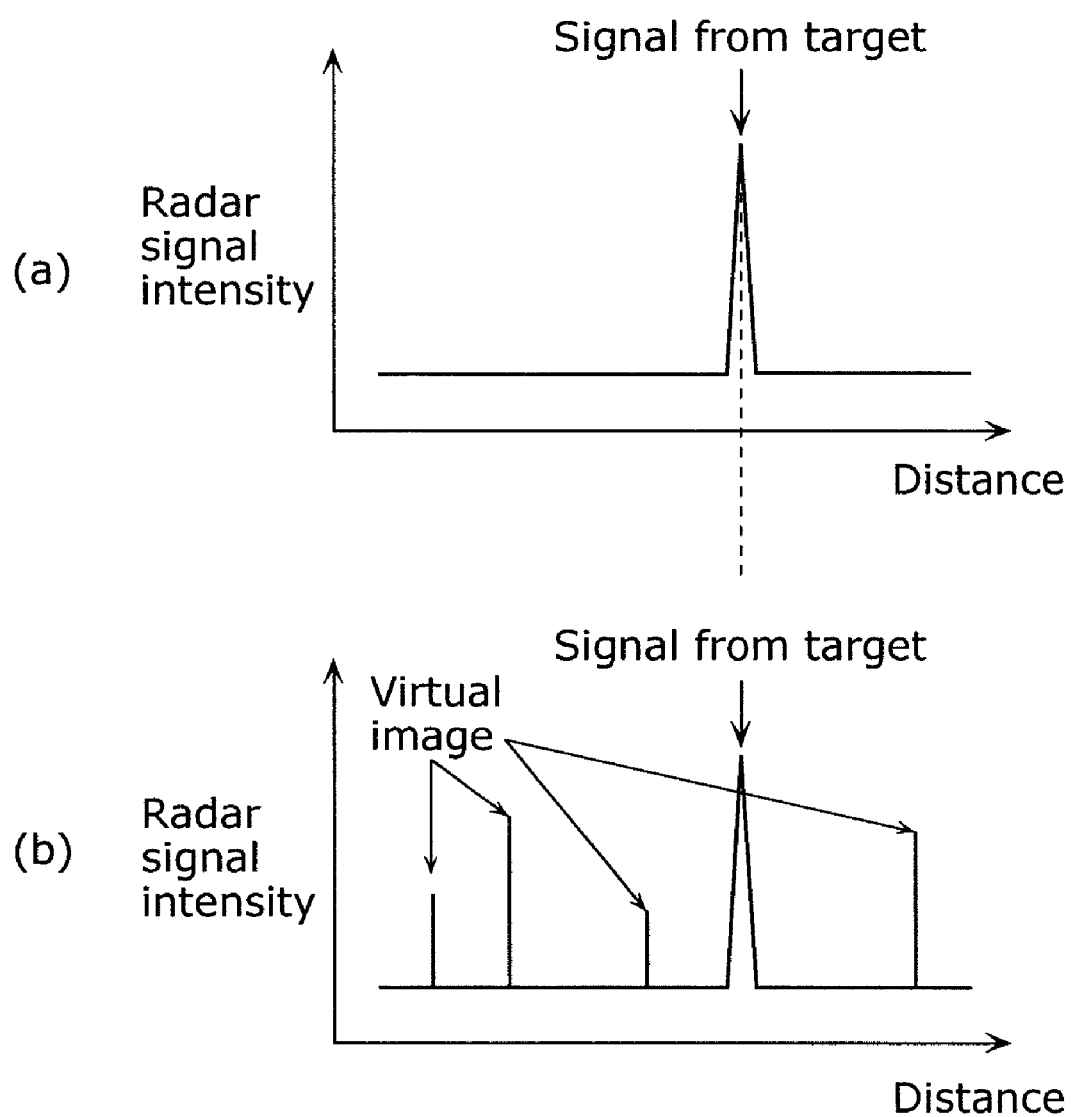
FIG. 2 illustrates an outline of a radar signal that has been spread-demodulated.
Figure 3:
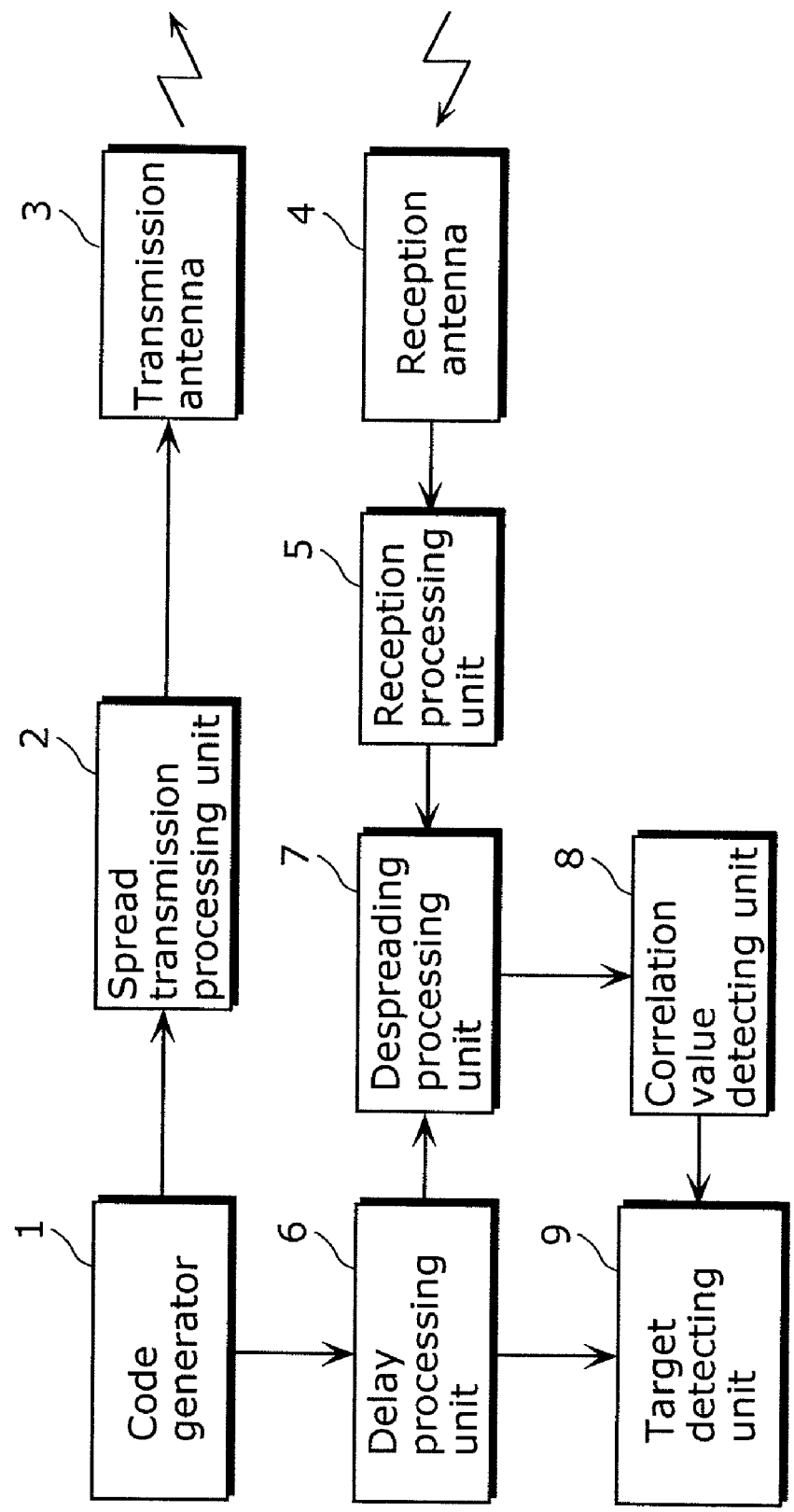
FIG. 3 illustrates a functional block diagram of a conventional spread spectrum radar apparatus that reduces false detection.

NUMERICAL REFERENCES 100, 500, 800, 1000, 1200, 1300 Radar system
110 Transmission code generator
111 Local oscillator
112 Spread modulator
113 Transmission antenna
120 Reception antenna
121 Reception code generator
122 Spread demodulator
123 Mixer 130 Virtual image determining unit
131 Code-change controller
132 Virtual-image determining calculation circuit
133 Switching controller
140 Signal attenuator
151 Transmission switch
152 Reception switch
160 Radar signal calculation device

BEST MODE FOR CARRYING OUT THE INVENTION

An embodiment according to the present invention will be described hereinafter with reference to drawings.

Embodiment 1

A spread spectrum radar system (hereinafter referred to as radar system) spread-modulates a narrow band signal generated by a local oscillator to a wide band signal using a transmission pseudo-noise code, and transmits the wide band signal as radar waves. Then, the radar system receives, as a reception signal, the wide band signal obtained by reflecting the transmitted reflected waves from an object, and spread-demodulates the reception signal to the narrow band signal, using a reception pseudo-noise code obtained by delaying the transmission pseudo-noise code. The radar system generates a radar signal by frequency conversion by mixing a correlation signal that is a result of the demodulation and the narrow band signal generated by the local oscillator. Based on the radar signal, the radar system can determine the presence or absence of an object, a distance to the object, a relative velocity of the object, and others.

However, in a conventional spread spectrum radar system, there are cases where a peak appears in a position where in principle it does not appear, due to a nonlinear characteristic of a constituent device, reflection by propagation of signals from one line to another, reflection caused by a mismatch, and others.

Thus, according to the spread spectrum radar apparatus of Embodiment 1, a virtual image determining unit determines whether or not a virtual image is present in a radar signal, and reduces a probability of falsely detecting the presence of an object by a virtual image, through performing a correction calculation.

Figure 4:
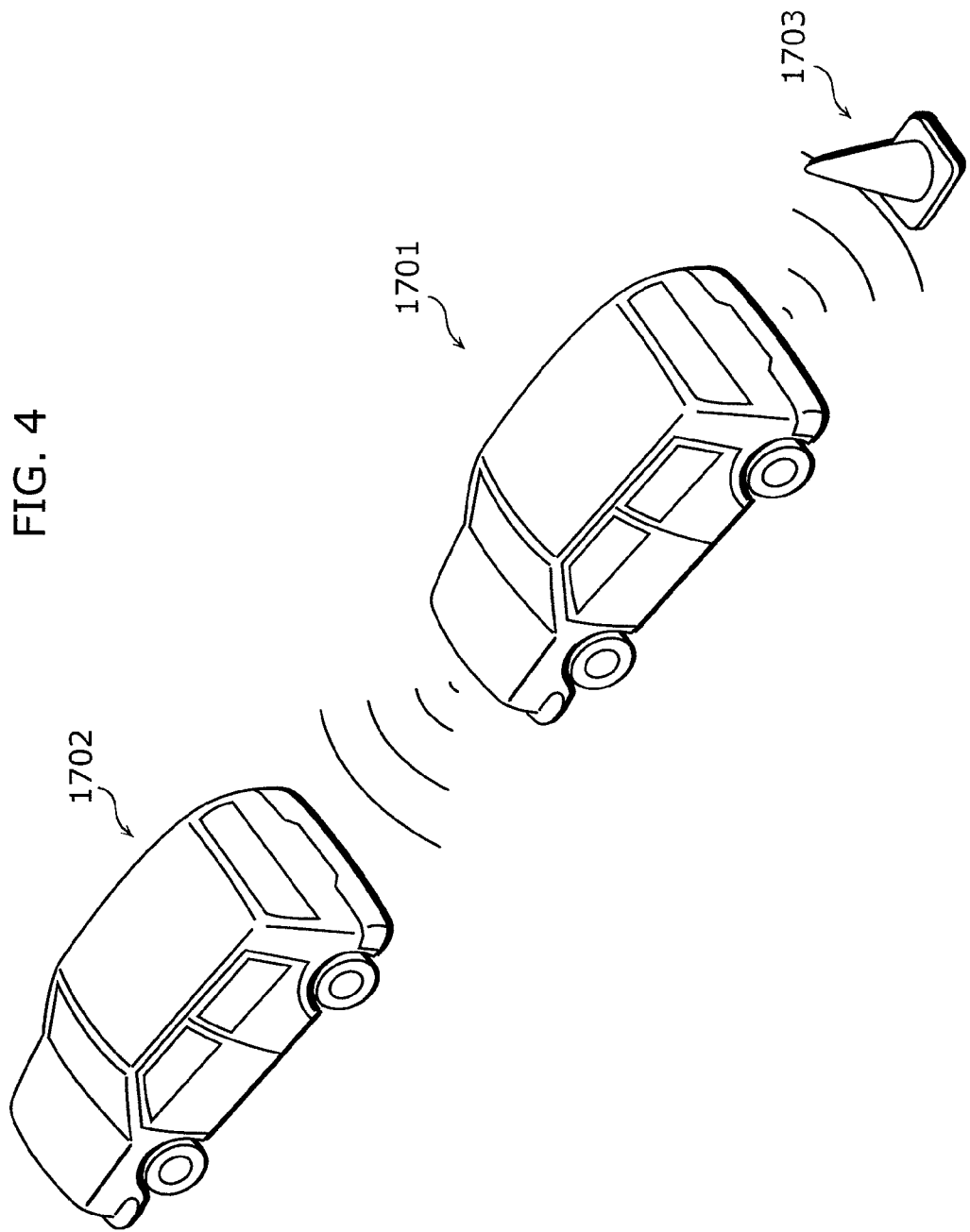
FIG. 4 illustrates a reference drawing of a spread spectrum radar apparatus according to an aspect of the present invention.

The spread spectrum radar apparatus according to the present invention is included in each of a front and a tail of a vehicle 1701, for example, as shown in FIG. 4, radiates detection radio waves to an object, such as an obstruction 1703, receives the detection radio waves reflected from the object, and determines the presence or absence of, a distance to, and a relative velocity of the obstruction 1703.

Figure 5:
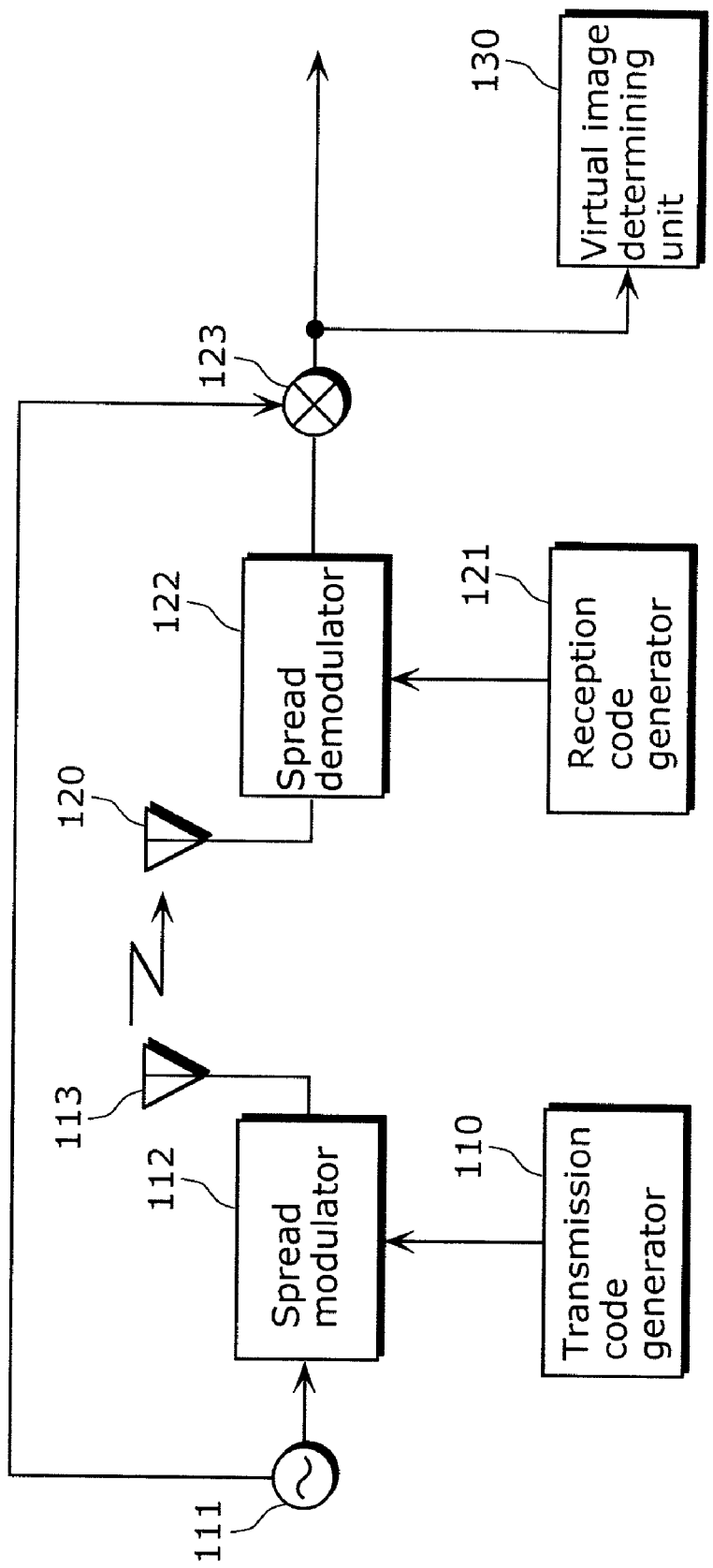
FIG. 5 illustrates a functional block diagram of a spread spectrum radar system according to Embodiment 1.

FIG. 5 illustrates a functional block diagram of a spread spectrum radar system 100 according to Embodiment 1.

The spread spectrum radar system 100 includes: a transmission code generator 110 that generates a transmission pseudo-noise code; a local oscillator 111 that is used as a carrier waves oscillator; a spread modulator 112 that performs spread modulation using a signal generated by the local oscillator 111 and the transmission pseudo-noise code; a transmission antenna 113 that radiates a signal; a reception antenna 120 that receives a signal; a reception code generator 121 that generates a reception pseudo-noise code; a spread demodulator 122 that demodulates a signal using the received signal and the reception pseudo-noise code; a mixer 123 that mixes the demodulated signal and the signal generated by the local oscillator 111 to generate a radar signal; and a virtual image determining unit 130 that determines whether or not a virtual image is present in the radar signal.

Next, the operation procedures of the spread spectrum radar system 100 of Embodiment 1 will be described.

The transmission code generator 110 generates a transmission pseudo-noise code, and supplies the generated transmission pseudo-noise code to the spread modulator 112. Here, the transmission pseudo-noise code is a pseudo-noise code, such as an M-sequence code and a Gold sequence code as described above. Here, the M-sequence code is used due to its superior autocorrelation characteristic.

The local oscillator 111 generates a narrow band signal, and supplies the generated narrow band signal to the spread modulator 112. Although the local oscillator 111 described herein solely functions for both transmission and reception, two different local oscillators respectively for transmission and reception that operates on the same frequency or different frequencies may be provided in the spread spectrum radar system 100. However, in such a case, the spread spectrum radar system 100 needs devices such as a Phase Locked Loop (PLL) for stabilizing frequencies, thus making the configuration more complicated.

The spread modulator 112 spread-modulates the narrow band signal supplied by the local oscillator 111 to a wide band signal using the transmission pseudo-noise code supplied by the transmission code generator 110. The spread modulator 112 transmits the spread-modulated wide band signal through the transmission antenna 113. The spread modulator 112 may perform signal processing, such as frequency conversion and amplification as necessary, when spread-modulating the narrow band signal to the wide band signal.

The reception code generator 121 generates a reception pseudo-noise code, and supplies the generated reception pseudo-noise code to the spread demodulator 122. Here, the reception pseudo-noise code is a code obtained by delaying the transmission pseudo-noise code. In other words, the reception pseudo-noise code is of the same type as that of transmission pseudo-noise code, and is a pseudo-noise code obtained by delaying the transmission pseudo-noise code by a predetermined count of chips.

The spread demodulator 122 spread-demodulates the wide band signal received through the reception antenna 120 to a correlation signal in a narrow band, using the reception pseudo-noise code supplied by the reception code generator 121. Here, when a phase of a reception signal and a phase of the reception pseudo-noise code match each other (a synchronous state), the correlation signal is demodulated to the narrow band signal, resulting in a larger correlation value. When they do not match each other (a non-synchronous state), the correlation signal is not demodulated and remains the same, resulting in a smaller correlation value. The spread demodulator 122 may perform, on a reception signal received through the reception antenna 120, processing such as the frequency conversion and low noise amplification as necessary.

The mixer 123 mixes the correlation signal supplied by the spread demodulator 122 and the signal generated by the local oscillator 111 to generate a radar signal. Based on the radar signal, the mixer 123 determines the presence or absence of an object, a distance to, and a relative velocity of the object, and others. Although the mixer 123 is not necessarily included in the spread spectrum radar system 100, since the radar signal in such a case has a frequency identical or comparable to that of the carrier waves, the radar signal processing downstream of the spread demodulator 122 becomes difficult.

The virtual image determining unit 130 determines whether or not the virtual image occurs from the radar signal supplied by the mixer 123.

Hereinafter, a method for determining a virtual image will be described using specific examples.

Figure 6:
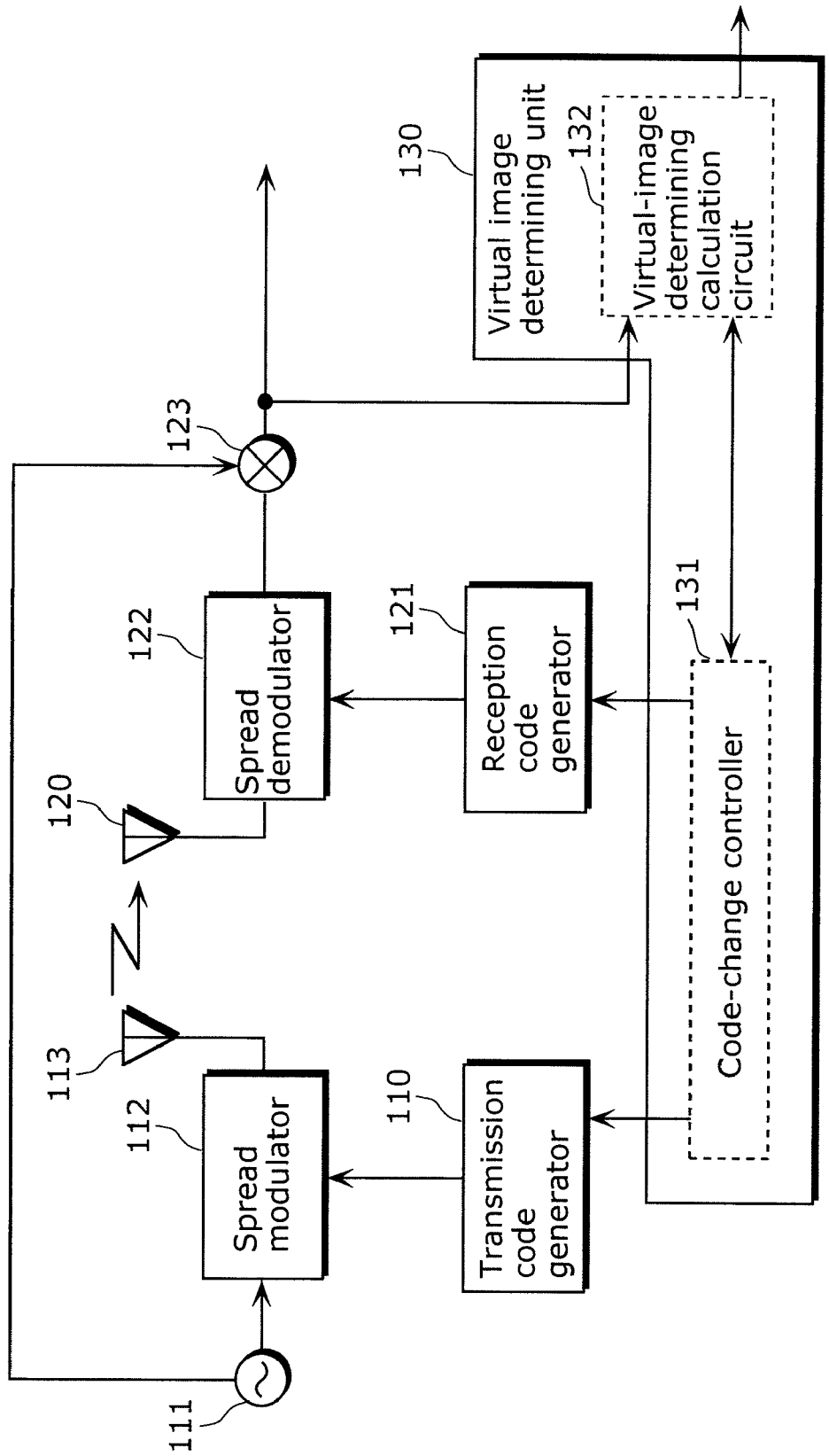
FIG. 6 illustrates a detailed functional block diagram of a virtual image determining unit included in the spread spectrum radar system according to Embodiment 1.

FIG. 6 illustrates a detailed functional block diagram of the virtual image determining unit 130 included in the spread spectrum radar system 100 according to Embodiment 1. The M-sequence code that is superior in its autocorrelation characteristic will be used as the pseudo-noise code herein.

First, a method for determining occurrence of a virtual image through changing a pseudo-noise code will be described.

The virtual image determining unit 130 in FIG. 6 includes a code-change controller 131 that changes the M-sequence code to a different code, and a virtual-image determining calculation circuit 132 that determines whether or not a virtual image occurs.

The code-change controller 131 changes the M-sequence code when determining a virtual image. When changing the M-sequence code, the code-change controller 131 transmits a control signal to the virtual-image determining calculation circuit 132, and changes the M-sequence code to another code. For example, assuming that a type of the M-sequence code that is currently used is an A code and a type of another code is a B code, when the code-change controller 131 changes the A code to the B code, it transmits the control signal to the virtual-image determining calculation circuit 132. Furthermore, the code-change controller 131 changes the changed B code to the initial A code, and it transmits another control signal to the virtual-image determining calculation circuit 132 in the same manner.

Upon receipt of the control signals from the code-change controller 131, the virtual-image determining calculation circuit 132 compares a radar signal of the A code and a radar signal of the B code after change in the code. Furthermore, upon change of the M-sequence code from the B code to the A code, the virtual-image determining calculation circuit 132 compares a radar signal of the B code and a radar signal of the A code. The code-change controller 131 changes a type of a code, for example, on a per one radar scan cycle basis or on a per plural radar scan cycles basis.

Figure 7:
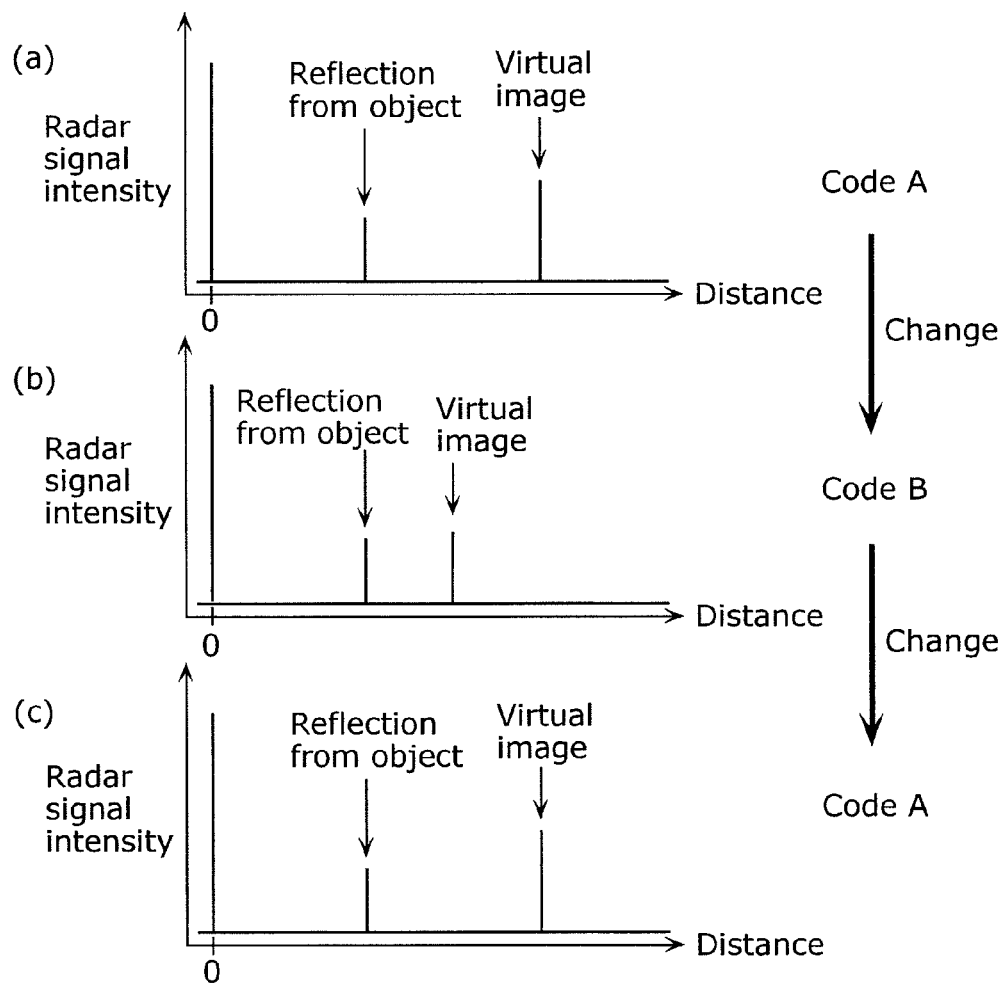
FIG. 7 illustrates a case where an object whose radar signal is desired to be detected is standstill, when a code-change controller changes a code.
Figure 8:
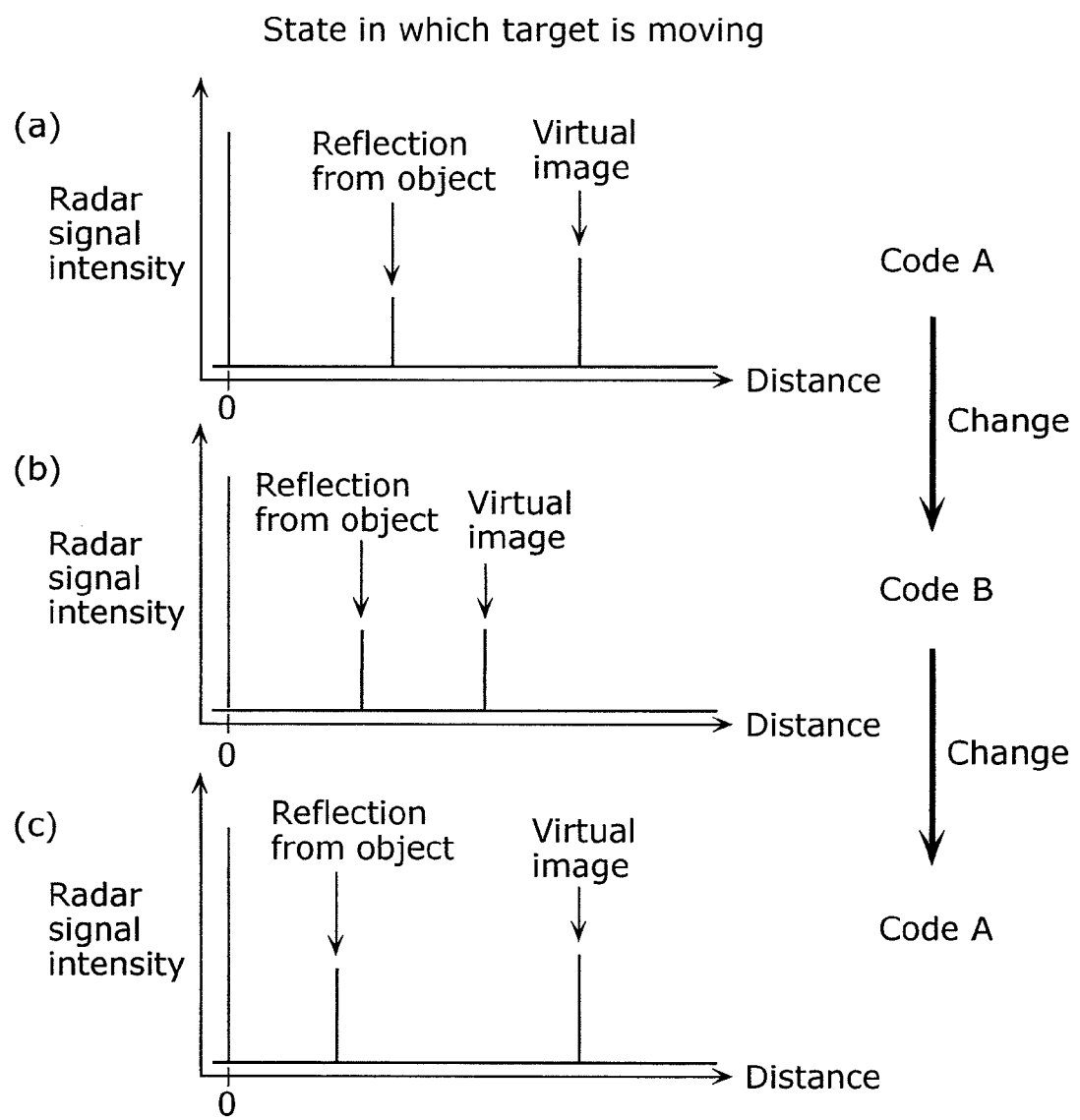
FIG. 8 illustrates a case where an object whose radar signal is desired to be detected is moving, when a code-change controller changes a code.

FIGS. 7 and 8 illustrate each case where an object whose radar signal is desired to be detected is standstill and moving, when the code-change controller 131 of the virtual image determining unit 130 changes a code.

FIG. 7 illustrates a case where an object whose radar signal is desired to be detected is standstill, when the code-change controller 131 changes a code.

As illustrated in (a) to (c) in FIG. 7, when the object is standstill, even in the case where the code is changed, reflected signals from the object are observed in the same position. In contrast, virtual images are observed in different positions for each change in the code. Thus, the virtual image observed in the A code disappears but a new virtual image occurs when the A code is changed to the B code.

Furthermore, since a virtual image is observed in a fixed position for each of the codes, the virtual image observed in the A code in (a) of FIG. 7 disappears when the A code is changed to the B code as illustrated in (b) of FIG. 7, and reappears when the B code is restored to the A code as illustrated in (c) of FIG. 7. In other words, the virtual image determining unit 130 can locate a position of a virtual image and determine the virtual image, with a change from the A code to the B code and further restoration to the A code. The peak observed in a position where the distance is indicated by "0" represents a radar signal corresponding to radar waves transmitted from the transmission antenna 113 and directly received by the reception antenna 120.

Accordingly, the code-change controller 131 in FIG. 6 stores codes of different types in the transmission code generator 110 and the reception code generator 121 in advance, or is provided with a function of changing a code to another in order to change a code when a virtual image occurs and to change the code until the virtual image disappears from a scan range. Alternatively, the current code is changed to a code having little influence of a virtual image. Thereby, the virtual image determining unit 130 can avoid the influence of a virtual image by determining the virtual image, and correcting an image determined as the virtual image through a calculation.

Here, the function of the code-change controller 131 that can change the code to another is, for example, to change codes at any time according to a change instruction to the code, by using a programmable LSI, such as Field Programmable Gate Array (FPGA) and providing calculations for generating an M-sequence code.

Next, a case where an object is moving will be described with reference to FIG. 8.

FIG. 8 illustrates a case where an object whose radar signal is desired to be detected is moving, when the code-change controller 131 changes a code.

As illustrated in (a) to (c) in FIG. 8, when the object is moving, the A code in (a) of FIG. 8 is changed to the B code in (b) of FIG. 8. Then, when the B code is restored to the A code in (c) of FIG. 8, the object is not observed in the same position because of its motion.

Since a virtual image is observed in a fixed position for each of the codes and virtual images for the same code are observed in the same position, the virtual image determining unit 130 can locate a position of a virtual image with a change from the A code in (a) of FIG. 8 to the B code in (b) of FIG. 8 and further restoration to the A code in (c) of FIG. 8.

Thus, changing the M-sequence code can determine whether or not a virtual image occurs. Although the M-sequence codes of 2 types are changed in the description of Embodiment 1, even when types of codes to be changed are increased, the same result can be obtained.

Next, a spread spectrum radar apparatus that reduces the influence of a virtual image signal when a virtual image occurs will be described with reference to FIGS. 9 and 10.

Figure 9:
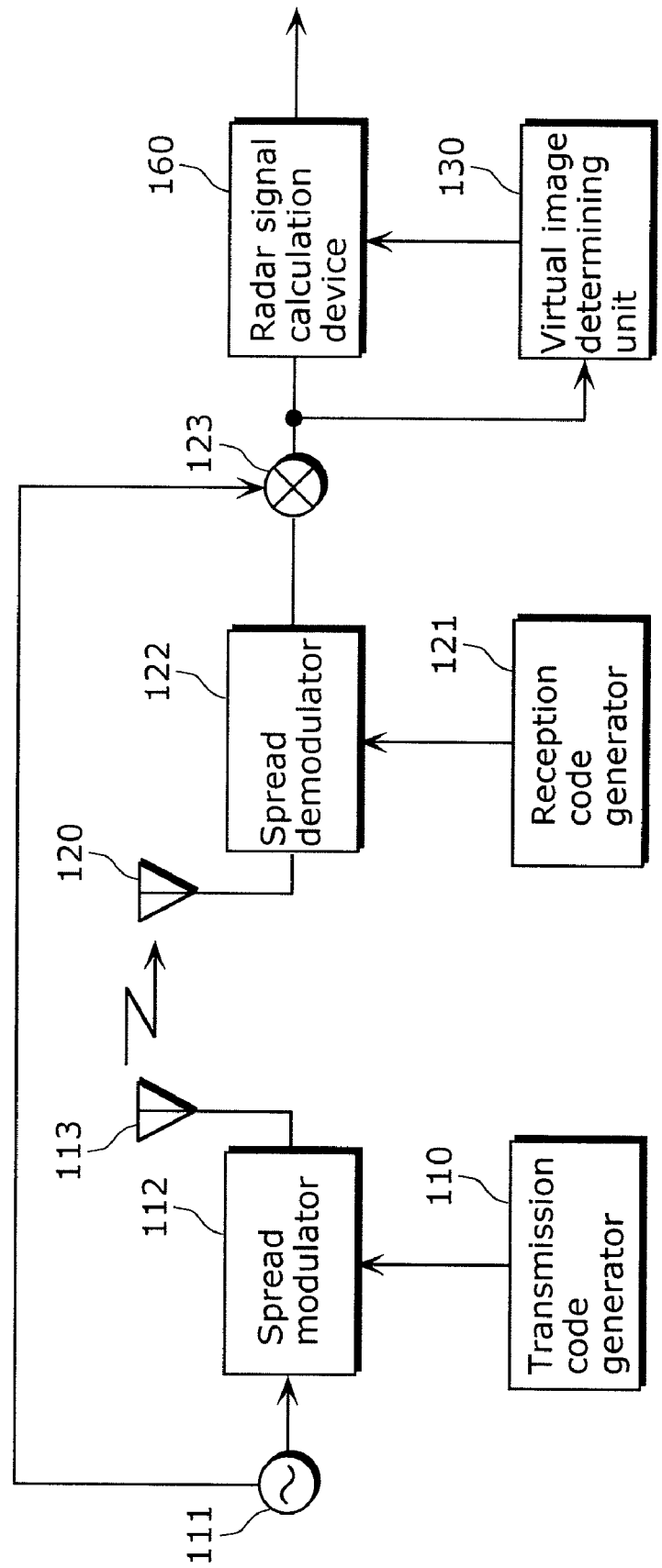
FIG. 9 illustrates a functional block diagram of the radar system according to Embodiment 1.

A radar system 500 in FIG. 9 is characterized by newly including a radar signal calculation device 160 that performs a calculation on a radar signal using a virtual image determination signal provided from the virtual image determining unit 130, in addition to the configuration of the radar system 100 in FIG. 5 that determines a virtual image by changing a code.

The location of a virtual image can be determined according to a method for converting a code as described hereinbefore. Thus, the radar signal calculation device 160 in FIG. 9 performs a correction calculation for reducing the influence of a virtual image occurring from a radar signal provided from the mixer 123, using the virtual image determination signal provided from the virtual image determining unit 130.

Figure 10:
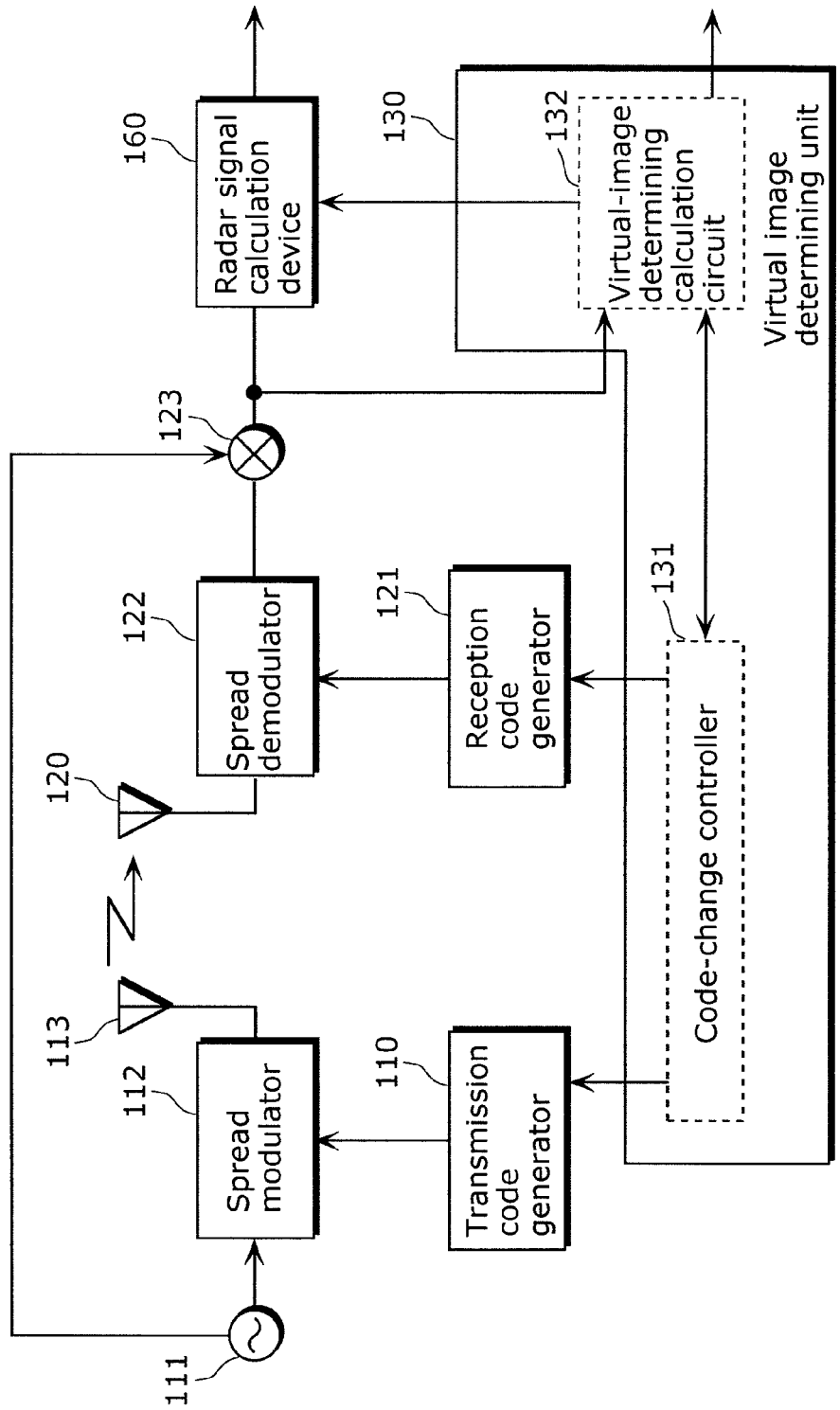
FIG. 10 illustrates a functional block diagram of the radar system with details of the virtual image determining unit of the radar system in FIG. 9.

Furthermore, FIG. 10 illustrates a functional block diagram of the radar system 500 with details of the virtual image determining unit 130 of the radar system 500 in FIG. 9, in which the radar system 100 in FIG. 6 that determines a virtual image by changing a code includes the radar signal calculation device 160 as described before.

The virtual image determining unit 130 determines a position of a virtual image and a peak intensity, while the radar signal calculation device 160 suppresses the virtual image using the virtual image determination signal.

Furthermore, the radar signal calculation device 160 changes a code after one radar scan cycle or plural radar scan cycles, and adds the radar signal to average the codes each time the code is changed so that the influence of the virtual image can be suppressed. The number of change in the code is added for averaging the codes for each time the code is changed. Thus, as the number increases, more the influence of the virtual image can be reduced, which enables provision of a radar apparatus that is more reliable.

More specifically, the virtual-image determining calculation circuit 132 in FIG. 10 calculates a correction coefficient for suppressing virtual images in a position where the virtual image corresponding to the observed radar signal occurs, multiplies the radar signals by the correction coefficient fed to the radar signal calculation device 160, and calculates and corrects an average value and an integrated value of the radar signals so as to reduce the influence of the virtual image.

Figure 11:
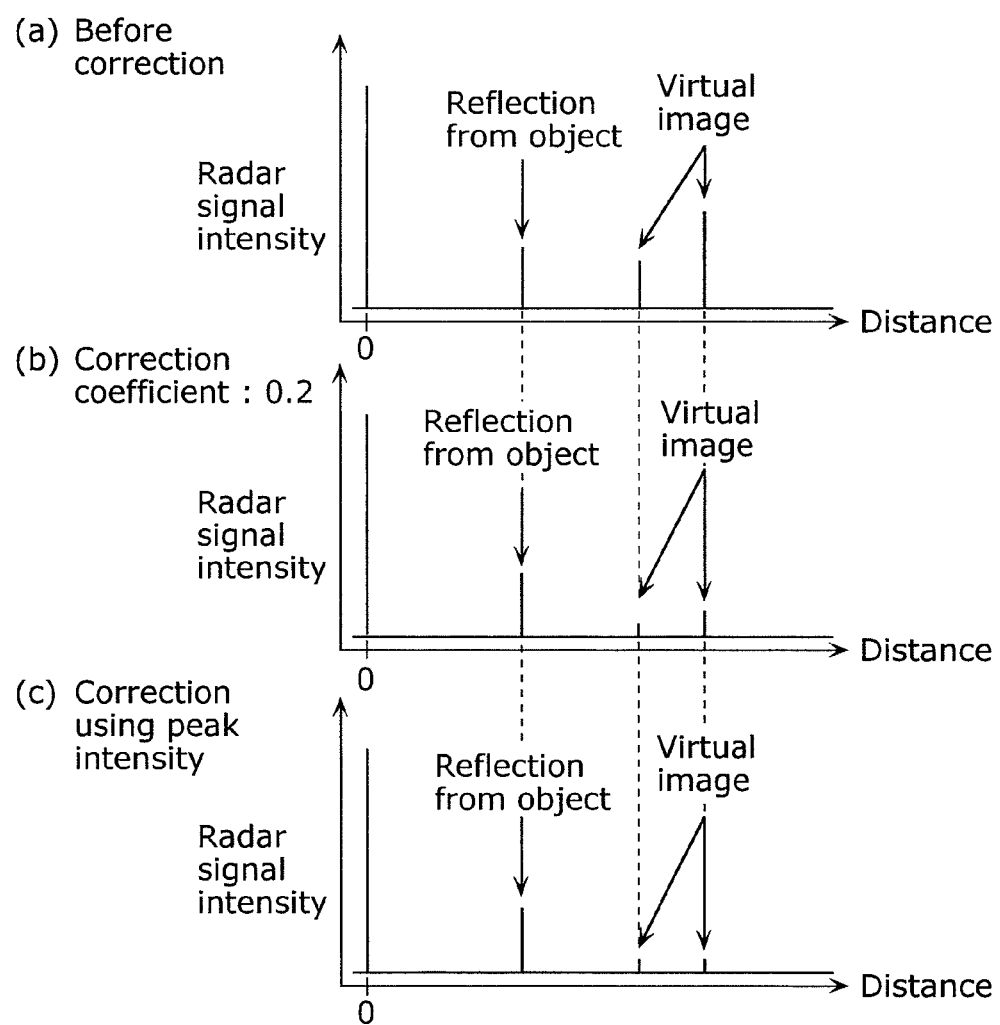
FIG. 11 illustrates graphs before and after multiplying a portion of a virtual image by a correction coefficient, after determining the virtual image using the radar system in Embodiment 1.

For example, FIG. 11 illustrates graphs before and after multiplying a portion of a virtual image by a correction coefficient 0.2, after determining the virtual image using the radar system 500 in Embodiment 1. Here, (a) in FIG. 11 illustrates a state before the correction, and (b) in FIG. 11 illustrates a state after the correction. Alternatively, the virtual-image determining calculation circuit 132 calculates a peak intensity of a virtual image corresponding to a radar signal, calculates a correction coefficient corresponding to the peak intensity, multiplies radar signals including the radar signal by the correction coefficient fed to the radar signal calculation device 160, and calculates and corrects an average value and an integrated value of the radar signals so as to reduce the influence of the virtual image.

For example, (c) in FIG. 11 illustrates a result obtained by multiplying a correction coefficient 0.1 for a virtual image having a higher peak intensity in (a) of FIG. 11, and a result obtained by multiplying a correction coefficient 0.2 for a virtual image having a lower peak intensity in (a) of FIG. 11. Assuming that a correction coefficient for a virtual image having the lowest peak intensity is 0.2 as a reference, a correction coefficient is determined by: correction coefficient= (0.2)×(peak intensity of a reference virtual image)/(peak intensity of a virtual image). Alternatively, correction coefficients may be determined as 0.2, 0.1, and 0.05 per 5 dB with respect to a level determined, in advance, as a reference of a noise floor.

As described above, the spread spectrum radar apparatus of Embodiment 1 can determine a virtual image occurring in real time during a radar operation, by changing a code using the code-change controller 131 included in the virtual image determining unit 130.

Furthermore, the radar signal calculation device 160 of the radar system 500 can perform a correction calculation on a virtual image signal, so that the influence of the virtual image can be reduced or avoided, and that a false operation of the radar apparatus due to the occurrence of an virtual image can be avoided. Thereby, provided is a spread spectrum radar apparatus that can reduce a probability of falsely detecting the presence of an object and that is superior in its safety.

Furthermore, the influence of a virtual image can be avoided by changing a pseudo-noise code until no virtual image is recognized within a scan range of a radar.

Embodiment 2

A spread spectrum radar apparatus according to Embodiment 2 in the present invention will be described hereinafter with reference to drawings.

Figure 12:
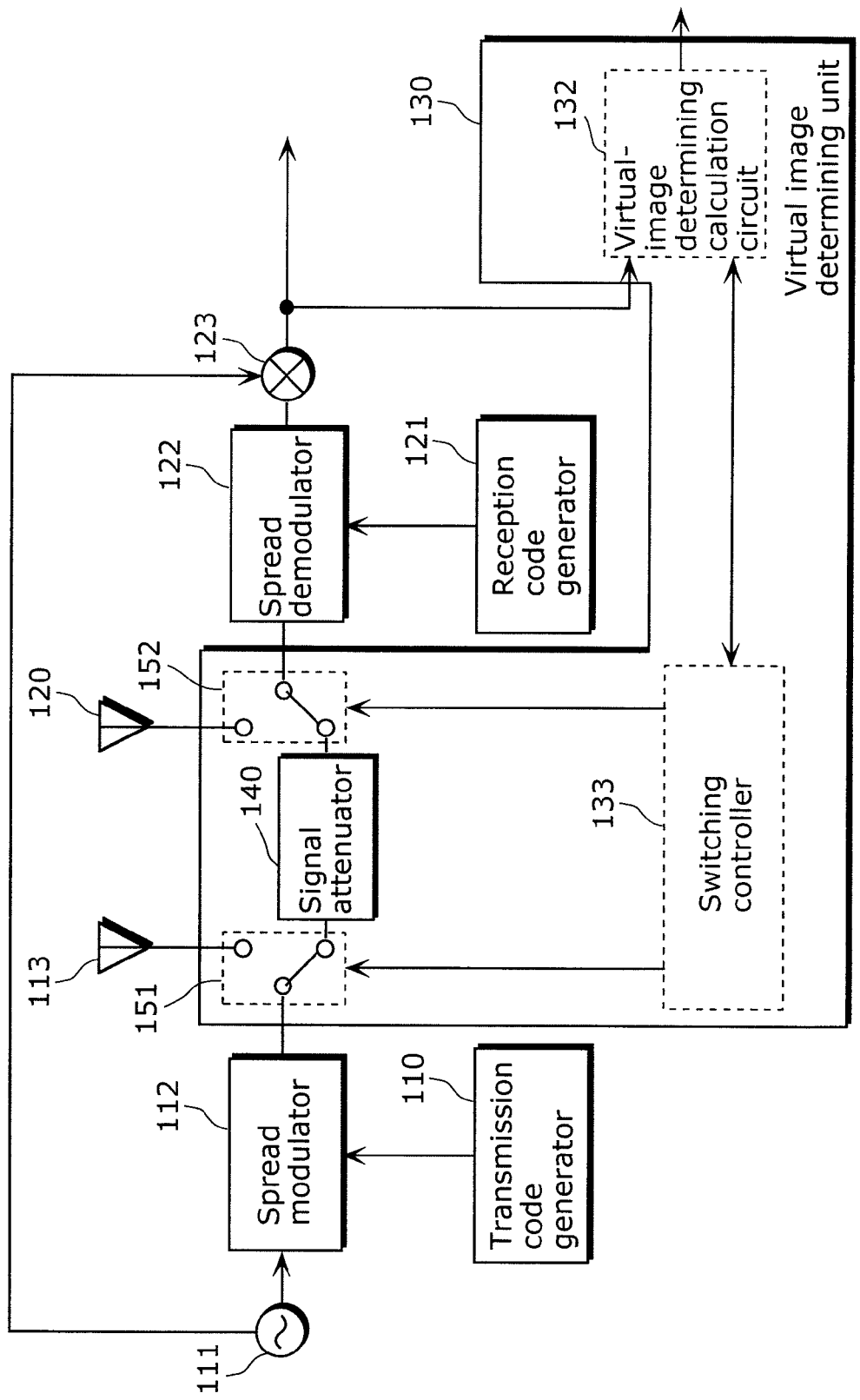
FIG. 12 illustrates a functional block diagram of a radar system according to Embodiment 2.

FIG. 12 illustrates a functional block diagram of a radar system 800 according to Embodiment 2. The spread spectrum radar apparatus according to Embodiment 2 is characterized in that a virtual image is determined before transmitting radar waves using a switching controller.

As illustrated in FIG. 12, the virtual image determining unit 130 in the radar system 800 according to Embodiment 2 includes a signal attenuator 140 that attenuates a signal, a transmission switch 151 that switches a connection between the signal attenuator 140 and the transmission antenna 113, a reception switch 152 that switches a connection between the signal attenuator 140 and the reception antenna 120, a switching controller 133 that determines each connection destination of the transmission switch 151 and the reception switch 152, and the virtual-image determining calculation circuit 132 that determines the presence or absence of a virtual image.

The switching controller 133 controls each connection destination of the transmission switch 151 and the reception switch 152. When the presence or absence of a virtual image is determined, the switching controller 133 provides a control signal to the virtual-image determining calculation circuit 132, and both of the transmission switch 151 and the reception switch 152 are connected to the signal attenuator 140. During a radar operation, the transmission switch 151 and the reception switch 152 are connected to the transmission antenna 113 and the reception antenna 120, respectively.

Figure 13:
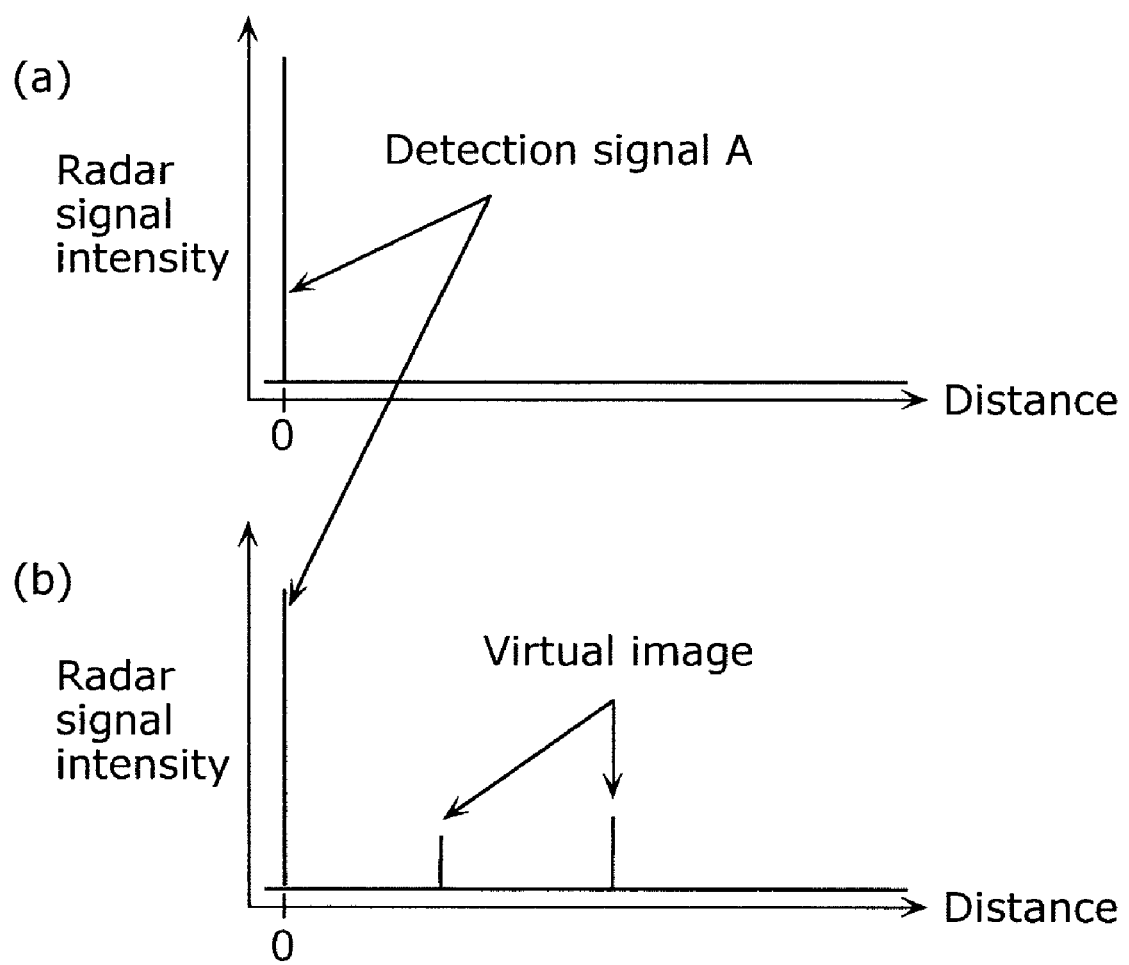
FIG. 13 illustrates a case where a virtual image is determined before transmitting radar waves using the radar system according to Embodiment 2.

When a virtual image is determined, the switching controller 133 provides control signals to the virtual-image determining calculation circuit 132, the transmission switch 151, and the reception switch 152. The transmission switch 151 and the reception switch 152 are connected to the signal attenuator 140. FIG. 13 illustrates an example of a radar signal when a radar operation is performed with the configuration.

FIG. 13 illustrates a case where the presence of a virtual image is determined before transmitting radar waves using the radar system 800 according to Embodiment 2.

As illustrated in (a) of FIG. 13, since the transmission antenna 113 does not radiate radar waves, any object to be a target does not exist, only a detection signal A is provided in a position delayed by a time period during which the detection signal A propagates through the signal attenuator 140. Thus, when signals different from the detection signal A occurs as illustrated in (b) of FIG. 13, all the signals can be determined as virtual images.

For the determination, a predetermined threshold is set, and the presence of a virtual image may be determined when a level of a signal reaches or exceeds the predetermined threshold. For example, assuming that the threshold is 10 dB with respect to the noise floor, it is determined that a signal having 10 dB or higher represents a virtual image.

Next, a spread spectrum radar apparatus that reduces the influence of a virtual image signal when a virtual image occurs will be described with reference to FIG. 14.

Figure 14:
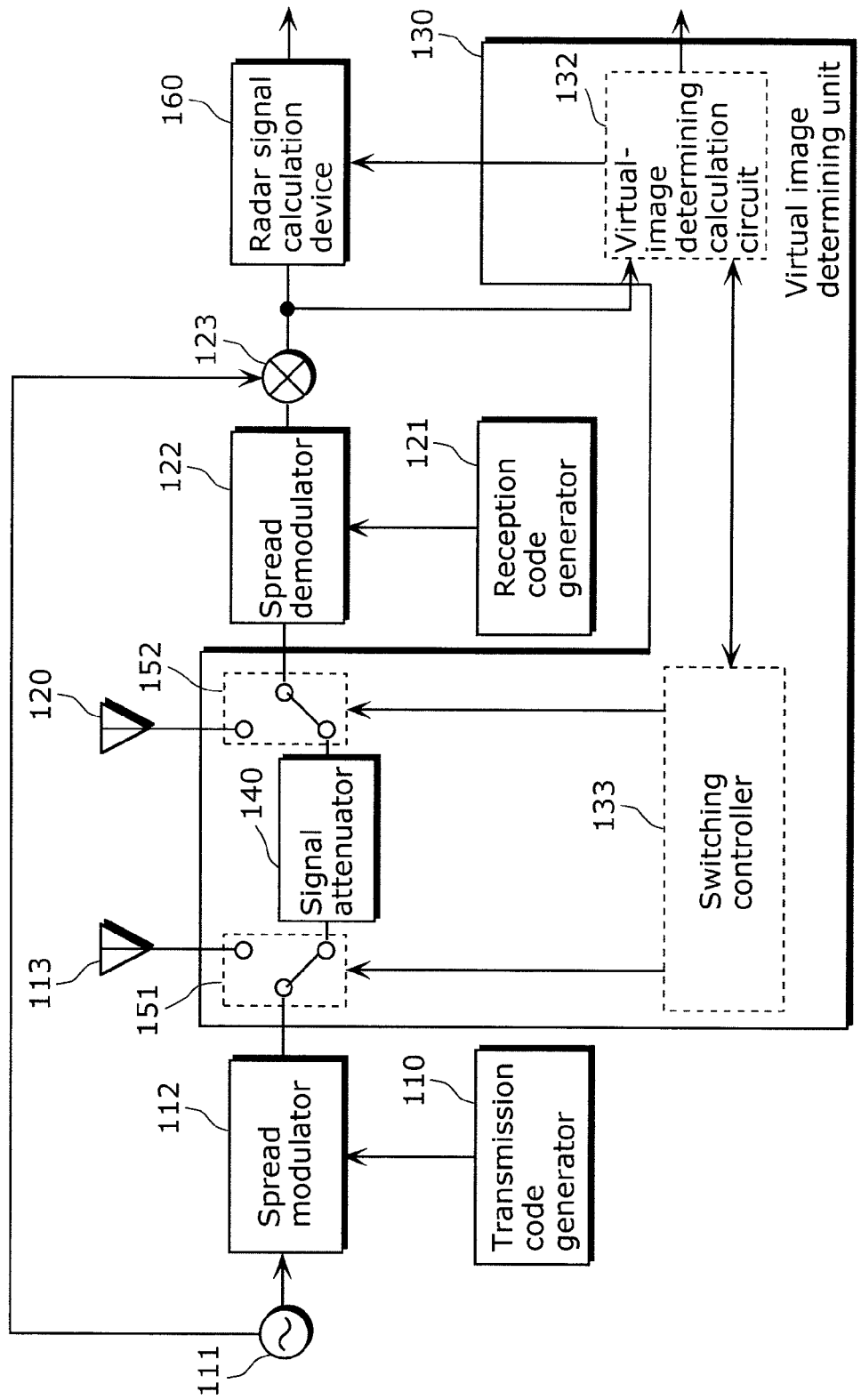
FIG. 14 illustrates a functional block diagram of the radar system including a radar signal calculation device according to Embodiment 2.

FIG. 14 illustrates a functional block diagram of a radar system 1000 including the radar signal calculation device 160 that is the same as that of the radar system 800 that determines a virtual image before transmitting radar waves in Embodiment 1.

As illustrated in FIG. 6, the virtual image determining unit 130 determines a position and a peak intensity of a virtual image, while the radar signal calculation device 160 performs a correction calculation for suppressing the virtual image, using a virtual image determination signal. The suppression effect on a virtual image can increase further using an offset signal.

Here, since the radar system 1000 determines the presence of a virtual image before transmitting radar waves, no reflection occurs from an object to be a target. Thus, the influence of the virtual image can be removed, by directly using the data as an offset radar signal.

Figure 15:
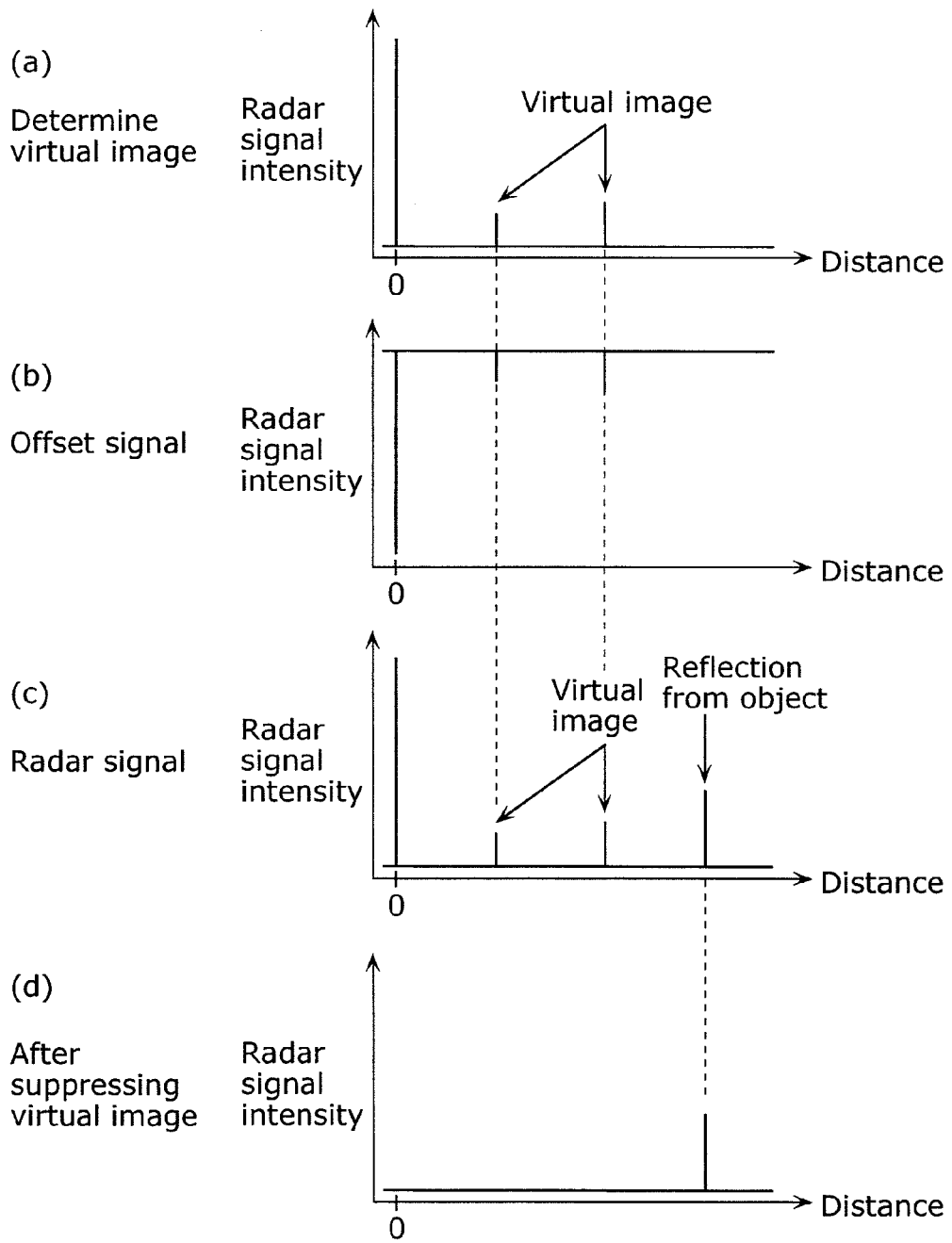
FIG. 15 illustrates an example of a correction calculation in the radar system according to Embodiment 2.

FIG. 15 illustrates a specific example of correction in the radar system according to Embodiment 2. More specifically, FIG. 15 illustrates an example of a correction calculation by the radar system 1000 according to Embodiment 2.

(a) of FIG. 15 illustrates a radar signal when the virtual image occurs in the case where the presence of a virtual image is determined. Since the radar signal includes no reflected signal from an object to be a target, the radar signal that appears in (a) of FIG. 15 is an unnecessary signal.

(b) of FIG. 15 illustrates a case where a signal in which positive and negative of the radar signal in (a) of FIG. 15 are reversed is used as an offset signal.

Next, the transmission switch 151 and the reception switch 152 are respectively connected to the transmission antenna 113 and the reception antenna 120, and each performs a normal radar operation. The radar signal in this case includes a reflected signal from an object to be a target, as illustrated in (c) of FIG. 15, and the reflected signal is fed to the radar signal calculation device 160. The radar signal calculation device 160 adds the radar signal in (b) of FIG. 15 to be used as an offset signal to the normal radar signal in (c) of FIG. 15, and a resultant radar signal is provided as illustrated in (d) of FIG. 15. Thereby, the virtual image completely disappears, and the radar signal calculation device 160 provides only the radar signal from the object. Here, a correction coefficient may be calculated using information of the radar signal in (a) of FIG. 15 so that the influence of the virtual image can be suppressed.

As described above, the spread spectrum radar apparatus according to Embodiment 2 can determine occurrence of a virtual image, before transmitting radar waves that is before an object is detected, using the switching controller 133 included in the virtual image determining unit 130.

Furthermore, the radar signal calculation device 160 can perform a correction calculation on a virtual image signal occurring so that the influence of the virtual image can be reduced or avoided, and that a probability of falsely detecting the presence of an object can be efficiently reduced. Thereby, the spread spectrum radar apparatus that is superior in its safety can be provided.

Figure 16:
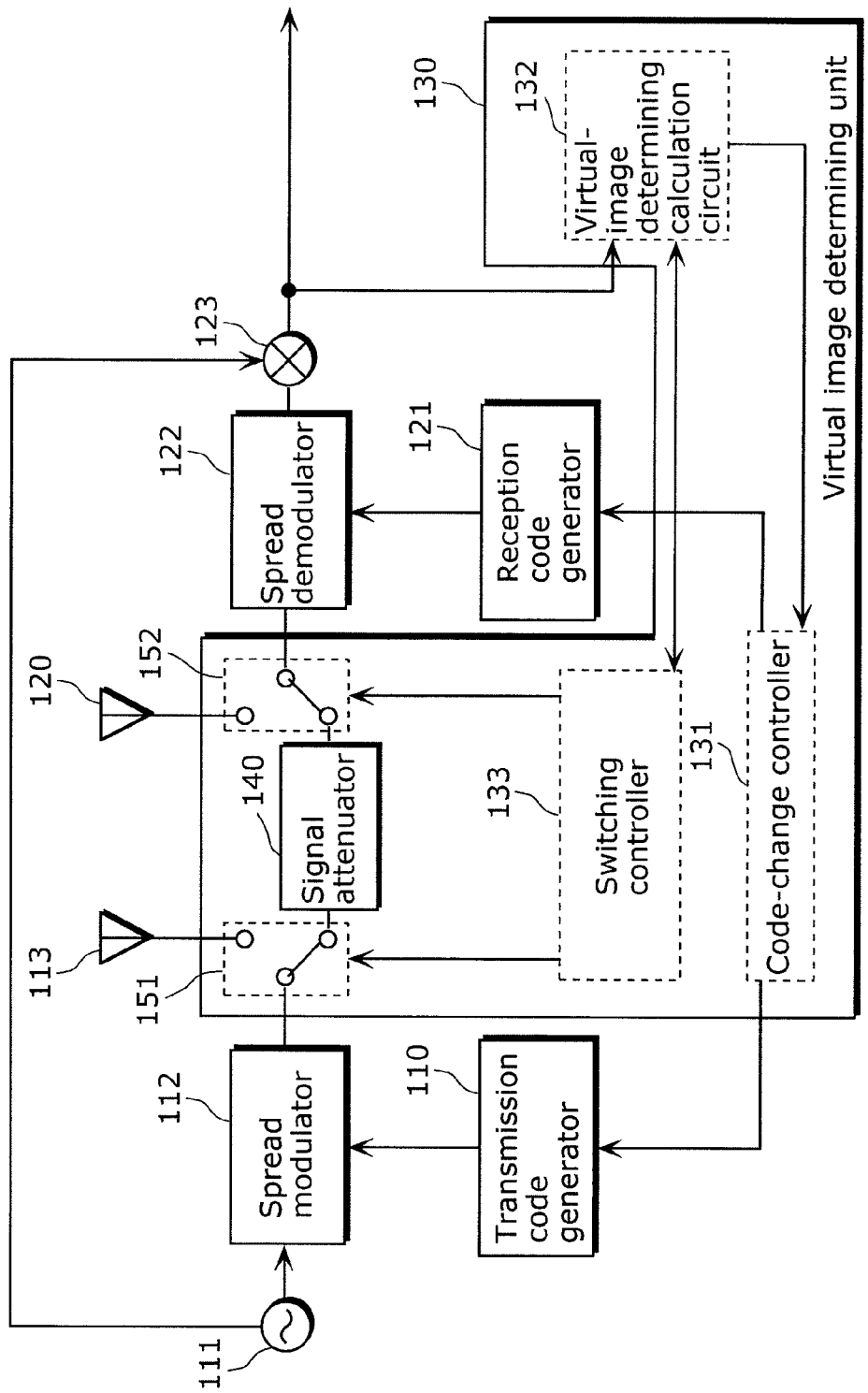
FIG. 16 illustrates a functional block diagram of a radar system in which a code-change controller is added to the configuration in FIG. 12.
Figure 17:
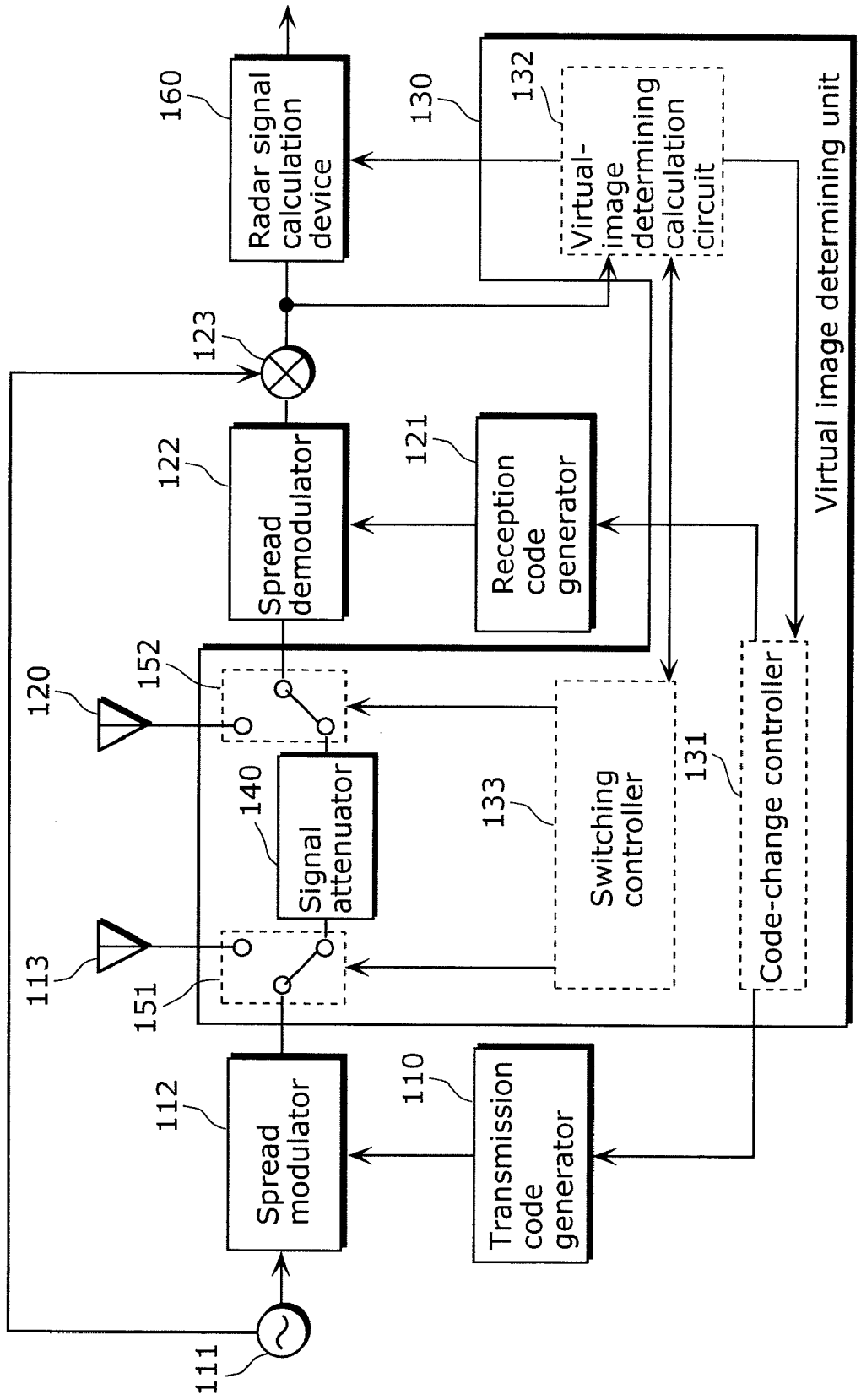
FIG. 17 illustrates a functional block diagram of the radar system obtained by adding the radar signal calculation device to the radar system.

FIGS. 16 and 17 illustrate combinations of functions of radar systems in the present invention.

FIG. 16 illustrates a functional block diagram of a radar system 1200 in which the code-change controller 131 is added to the configuration in FIG. 12.

When a virtual image can be determined as in the radar system 800 of Embodiment 2, the influence of the virtual image can be avoided with addition of the code-change controller 131 to the configuration in FIG. 12. Thereby, in the radar system 1200, the switching controller 133 determines the presence or absence of a virtual image before transmitting radar waves, while the code-change controller 131 changes the code of a signal that represents occurrence of the virtual image and that is received from the virtual-image determining calculation circuit 132. The code may be changed until the changed M-sequence code does not cause occurrence of a virtual image within a scan range of a radar.

Thereby, the influence of a virtual image can be avoided before transmitting radar waves, and a virtual image is appropriately determined even after an operation of detecting an object by transmitting the radar waves. Thereby, the safety in the spread spectrum radar apparatus can be improved.

Furthermore, the radar system 1200 in FIG. 16 may be replaced with a radar system 1300 including the radar signal calculation device 160.

FIG. 17 illustrates a functional block diagram of the radar system 1300 obtained by adding the radar signal calculation device 160 to the radar system 1200. The radar signal calculation device 160 can suppress a virtual image using an offset signal and using a correction coefficient, and further can suppress influence of the virtual image through a correction calculation by adding the radar signal in which a code is changed to average the codes. Thereby, a more reliable radar apparatus can be provided.

INDUSTRIAL APPLICABILITY

The present invention is applicable as a spread spectrum radar apparatus using a spread spectrum method, in particularly, as a spread spectrum radar apparatus that suppresses at least one alias signal that is different from a reception signal, and as an on-vehicle radar apparatus, for example.

The invention claimed is:

1. A spread spectrum radar apparatus that detects an object using detection radio waves that are spectrum-spread, said apparatus comprising:
    a local oscillator that generates a narrow band signal;
    a transmission code generator that generates a first pseudo-noise code;
    a reception code generator that generates a second pseudo-noise code obtained by delaying the first pseudo-noise code;
    a spread modulator that spread-modulates the narrow band signal generated by said local oscillator, using the first pseudo-noise code;
    a transmitter unit configured to transmit the signal spread-modulated by said spread modulator;
    a receiver unit configured to receive reflected waves of the signal transmitted by said transmitter;
    a spread demodulator that spread-demodulates a signal corresponding to the reflected waves received by said receiver, using the second pseudo-noise code;
    a mixer that generates a radar signal by frequency conversion using the signal spread-demodulated by said spread demodulator and the narrow band signal generated by said local oscillator; and
    a virtual image determiner configured to determine a virtual image from the radar signal having a frequency obtained by said mixer.

2. The spread spectrum radar apparatus according to claim 1,
    wherein said virtual image determiner includes:
    a code-change controller configured to repeatedly change a type of the first pseudo-noise code generated by said transmission code generator and a type of the second pseudo-noise code generated by said reception code generator; and
    a virtual-image calculator configured to determine the virtual image by comparing radar signals that include the radar signal and that are obtained before and after changing the type of the first pseudo-noise code and the type of the second pseudo-noise code.

3. The spread spectrum radar apparatus according to claim 2,
    wherein said code-change controller is configured to repeatedly change the type of the first pseudo-noise code and the type of the second pseudo-noise code until said virtual-image calculator determines that the virtual image is absent within a scan range.

4. The spread spectrum radar apparatus according to claim 2,
wherein said virtual-image calculator is configured to determine the radar signals as virtual images when said code-change controller repeatedly changes the type of the first pseudo-noise code and the type of the second pseudo-noise code, the radar signals of a same type being observed in a same position, and the radar signals of different types being observed in different positions.

5. The spread spectrum radar apparatus according to claim 2,
wherein said code-change controller is further configured to repeatedly change the type of the first pseudo-noise code and the type of the second pseudo-noise code alternately to a first code and a second code at predetermined intervals as different types of codes until said virtual-image calculator determines that the virtual image is absent within a scan range, and
said virtual-image calculator is configured to determine the radar signals as virtual images when said code-change controller changes the first code to the second code and further changes the second code to the first code repeatedly, the radar signals being observed in a same position using the first code, and the radar signals being observed in different positions using the second code.

6. The spread spectrum radar apparatus according to claim 1,
wherein said virtual image determiner further includes:
a signal attenuator that is positioned between said transmitter and said receiver;
a first switch that switches a connection between said spread modulator and said transmitter, or between said spread modulator and said signal attenuator;
a second switch that switches a connection between said spread demodulator and said receiver, or between said spread demodulator and said signal attenuator;
a switching controller configured to control switching of said first switch and said second switch; and
a virtual-image calculator configured to perform a calculation for determining the virtual image,
wherein said switching controller is configured, before said transmitter transmits the signal spread-modulated by said spread modulator, to control said first switch to switch the connection between said spread modulator and said signal attenuator, and to control said second switch to switch the connection between said spread demodulator and said signal attenuator, and
said virtual image determiner is configured to determine a radar signal as the virtual image, a radar signal being different from the radar signal that is delayed and is detected before said transmitter transmits the signal.

7. The spread spectrum radar apparatus according to claim 6,
wherein said virtual image determiner is configured to determine a detected radar signal as the virtual image, when the detected radar signal exceeds a predetermined threshold.

8. The spread spectrum radar apparatus according to claim 6,
wherein said switching controller is further configured, after said virtual image determiner determines the virtual image, to control said first switch to switch the connection between said spread modulator and said transmitter, and to control said second switch to switch the connection between said spread demodulator and said receiver, and
said virtual image determiner further includes
a code-change controller configured to repeatedly change the type of the first pseudo-noise code generated by said transmission code generator and the type of the second pseudo-noise code generated by said reception code generator until said virtual-image calculator determines that the virtual image is absent within a scan range.

9. The spread spectrum radar apparatus according to claim 6, further comprising
a radar signal calculator configured to calculate the radar signal provided by said mixer, using a virtual image determination signal provided by said virtual image determiner.

10. The spread spectrum radar apparatus according to claim 1, further comprising
a radar signal calculator configured to calculate the radar signal provided by said mixer, using a virtual image determination signal provided by said virtual image determiner.

11. The spread spectrum radar apparatus according to claim 6, further comprising
a radar signal calculator configured to calculate the radar signal provided by said mixer, using a virtual image determination signal provided by said virtual image determiner.

12. The spread spectrum radar apparatus according to claim 10,
wherein said radar signal calculator is configured to perform a correction calculation by multiplying radar signals including the radar signal by a correction coefficient, using the virtual image determination signal provided by said virtual image determiner, and calculating an average value or an integrated value of the radar signals, the correction coefficient suppressing the virtual image.

13. The spread spectrum radar apparatus according to claim 10,
wherein said radar signal calculator is configured to perform a correction calculation by determining a correction coefficient according to a peak intensity of the virtual image, the correction coefficient suppressing the virtual image.

14. The spread spectrum radar apparatus according to claim 10,
wherein said radar signal calculator is configured to generate a signal in which a polarity of the radar signal provided by said spread demodulator is reversed, using the virtual image determination signal provided by said virtual image determiner, and to perform a correction calculation by adding the signal in which the polarity of the radar signal provided by said spread demodulator is reversed to the radar signal provided by said spread demodulator.

15. A method for determining a virtual image executed by a spread spectrum radar apparatus that detects an object using detection radio waves that are spectrum-spread, the method comprising:
generating a narrow band signal;
generating a first pseudo-noise code;
generating a second pseudo-noise code obtained by delaying the first pseudo-noise code;
spread-modulating the narrow band signal generated in the generating of a narrow band signal, using the first pseudo-noise code;
transmitting the signal spread-modulated in the spread-modulating;

receiving reflected waves of the signal transmitted in the transmitting;

spread-demodulating a signal corresponding to the reflected waves received in the receiving, using the second pseudo-noise code;

generating a radar signal by frequency conversion using the signal spread-demodulated in the spread-demodulating and the narrow band signal generated in the generating of a narrow band signal; and determining a virtual image from the radar signal having a frequency obtained in the generating of a radar signal.

16. A method for suppressing a virtual image executed by a spread spectrum radar apparatus that detects an object using detection radio waves that are spectrum-spread, the method comprising:

generating a narrow band signal;

generating a first pseudo-noise code;

generating a second pseudo-noise code obtained by delaying the first pseudo-noise code;

spread-modulating the narrow band signal generated in the generating of a narrow band signal, using the first pseudo-noise code;

transmitting the signal spread-modulated in the spread-modulating;

receiving reflected waves of the signal transmitted in the transmitting;

spread-demodulating a signal corresponding to the reflected waves received in the receiving, using the second pseudo-noise code;

generating a radar signal by frequency conversion using the signal spread-demodulated in the spread-demodulating and the narrow band signal generated in the generating of a narrow band signal;

determining a virtual image from the radar signal having a frequency obtained in the generating of a radar signal; and calculating the radar signal provided in the generating of the radar signal, using a virtual image determination signal provided in the determining of a virtual image.

* * * * *